US008813165B2

(12) United States Patent
Klughart

(10) Patent No.: US 8,813,165 B2
(45) Date of Patent: Aug. 19, 2014

(54) AUDIO/VIDEO STORAGE/RETRIEVAL SYSTEM AND METHOD

(76) Inventor: Kevin Mark Klughart, Denton, TX (US)

( * ) Notice: Subject to any disclaimer, the term of this patent is extended or adjusted under 35 U.S.C. 154(b) by 116 days.

(21) Appl. No.: 13/200,572

(22) Filed: Sep. 25, 2011

(65) Prior Publication Data

US 2013/0081098 A1 Mar. 28, 2013

(51) Int. Cl.
*H04N 7/16* (2011.01)
*H04N 7/173* (2011.01)
*H04N 5/765* (2006.01)

(52) U.S. Cl.
USPC ............... 725/142; 725/86; 725/88; 725/89; 725/91; 725/93; 725/94; 725/100; 725/135; 725/139; 725/143; 725/145; 725/146; 725/147; 725/151; 386/200; 386/231; 386/232

(58) Field of Classification Search
USPC ............. 725/86, 88, 89, 91, 93, 94, 100, 135, 725/139, 142, 143, 145, 146, 147, 151; 386/200, 231, 232
See application file for complete search history.

(56) References Cited

U.S. PATENT DOCUMENTS

| 4,873,665 | A | 10/1989 | Jiang et al. |
|---|---|---|---|
| 5,164,613 | A | 11/1992 | Mumper et al. |
| 5,299,156 | A | 3/1994 | Jiang et al. |
| 5,363,361 | A | 11/1994 | Bakx |
| 5,532,958 | A | 7/1996 | Jiang et al. |
| 5,926,602 | A | 7/1999 | Okura |
| 6,118,690 | A | 9/2000 | Jiang et al. |
| 6,324,338 | B1 | 11/2001 | Wood et al. |
| 6,405,239 | B1 | 6/2002 | Addington et al. |
| 7,600,070 | B1* | 10/2009 | Linnell .......................... 710/316 |
| 7,814,272 | B2 | 10/2010 | Barrall et al. |
| 7,814,273 | B2 | 10/2010 | Barrall |
| 7,818,531 | B2 | 10/2010 | Barrall |
| 7,873,782 | B2 | 1/2011 | Terry et al. |
| 7,889,964 | B1 | 2/2011 | Barton et al. |
| 2002/0102092 | A1* | 8/2002 | Thai .............................. 386/46 |

(Continued)

OTHER PUBLICATIONS

Iomega; "Using Iomega StorCenter IX 12-300R with Windows Server2008 R2 HYPER-V Over iSCSI", White Paper (online): Iomega Corporation; Mar. 2011; http://download.iomega.com/nas/pdfs/hyperv-ovenscsi.pdf.
Hitachi Global Storage Technologies (datasheet); Hitachi Deskstar 7K3000 Hard Disk Drive Specification; Models HDS723020BLA642, HDS723015BLA642; Rev. 1.0; Oct. 28, 2010; USA.

(Continued)

*Primary Examiner* — Nasser Goodarzi
*Assistant Examiner* — Kyu Chae
(74) *Attorney, Agent, or Firm* — Carstens & Cahoon, LLP; Kevin M Klughart; David W. Carstens

(57) ABSTRACT

An audio/video storage/retrieval system and method that permits efficient and cost-effective simultaneous recording of multi-channel A/V information from a variety of sources is disclosed. The system/method may be broadly described as generally incorporating baseband conversion of source RF modulated A/V information followed by analog-to-digital conversion and storage on a storage device utilizing a dual port interface that incorporates an additional computer access port to permit transparent storage access by a computer system. Retrieval of stored A/V programming from the storage device via the dual port interface permits the stored A/V data to be converted to analog and RF modulated for presentation to an A/V presentation device. Additional A/V source and/or target selectors may be incorporated into the system/method to permit recording a plethora of A/V sources such as raw A/V signaling, OTA broadcasts, clear/encrypted cable QAM broadcasts, cable set top boxes (STBs), and the like.

18 Claims, 24 Drawing Sheets

(56) References Cited

U.S. PATENT DOCUMENTS

| | | | |
|---|---|---|---|
| 2003/0014762 | A1 | 1/2003 | Conover et al. |
| 2003/0063893 | A1* | 4/2003 | Read .............................. 386/46 |
| 2005/0195660 | A1 | 9/2005 | Kavuri et al. |
| 2007/0149148 | A1 | 6/2007 | Yoshikawa et al. |
| 2007/0266037 | A1 | 11/2007 | Terry et al. |
| 2008/0046947 | A1* | 2/2008 | Katznelson .................. 725/114 |
| 2008/0068513 | A1* | 3/2008 | Ariyoshi et al. ............. 348/734 |
| 2008/0162811 | A1 | 7/2008 | Steinmetz et al. |
| 2009/0016009 | A1 | 1/2009 | Barrall et al. |
| 2009/0036067 | A1 | 2/2009 | Rofougaran |
| 2009/0067363 | A1* | 3/2009 | Ruiz et al. .................... 370/315 |
| 2009/0292843 | A1* | 11/2009 | Haban et al. .................. 710/110 |
| 2010/0049919 | A1 | 2/2010 | Winokur et al. |
| 2010/0064104 | A1 | 3/2010 | Steinmetz et al. |
| 2010/0257401 | A1 | 10/2010 | Stolowitz |
| 2011/0013882 | A1 | 1/2011 | Kusunoki et al. |
| 2011/0035565 | A1 | 2/2011 | Barrall |
| 2011/0060773 | A1 | 3/2011 | Itoh |
| 2011/0072233 | A1 | 3/2011 | Dawkins et al. |

OTHER PUBLICATIONS

Hitachi Global Storage Technologies (datasheet); Hitachi Deskstar 7K1000 Hard Disk Drive Specification; Models HDS7721010KLA330, HDS7721075KLA330; Rev. 0.1; Jun. 21, 2007; USA.

Hitachi Global Storag Technologies (datesheet); Hitachi Deskstar 7K3000 Hard Disk Drive Specification; Models HUA723030ALA640; HUA723020ALA640; Rev. 1.1, Jan. 25, 2011; USA.

Serial ATA International Organization (specification); Serial ATA Revision 3.0—High Speed Serialized at Attachment, www.sata-io.org; Jun. 2, 2009; USA, Serial ATA International Organization (specification); Serial ATA Revision 2.6—High Speed Serialized at Attachment; www.sata-io.org; Feb. 15, 2007; USA.

Serial ATA International Organization (specification); Serial ATA Revision 2.5—High Speed Serialized at Attachment; www.sata-io.org; Oct. 27, 2005; USA.

* cited by examiner

*Prior Art*

*Prior Art*

*MythTV*

*Prior Art*

AUDIO/VIDEO STORAGE/RETRIEVAL SYSTEM AND METHOD

CROSS REFERENCE TO RELATED APPLICATIONS

This patent application is a Continuation-In-Part and incorporates by reference U.S. Utility patent application Ser. No. 13/200,242 entitled DATA STORAGE ARCHITECTURE EXTENSION SYSTEM AND METHOD, with inventor Kevin Mark K lughart and filed with the USPTO on Sep. 21, 2011.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for storing and/or retrieving audio/video information. This field includes but is not limited generally to United States Class 386, and may include U.S. Classifications 386/45, 386/46, 386/83, 386/95, 386/125, and 386/126, among others. The preferred application environment for the present invention is the storage/retrieval of audio/video information associated with television display systems and the like, and specifically the use of digital recording of television programs from a variety of information sources.

PRIOR ART AND BACKGROUND OF THE INVENTION

ReplayTV, Inc. Architecture (0100)

The general structure of prior art Digital Video Recorders (DVRs) is illustrated in the drawing of FIG. 1 (0100) (derived and relabeled from U.S. Pat. No. 6,324,338) which represents the technology from ReplayTV, Inc. In this configuration a computer processor (0101) incorporates program logic memory (0102) to interrogate a channel guide database (0103) that is matched to a criteria database (0104) used to select specific TV programs for recording. The channel guide database (0103) is loaded from a channel guide data source (0109) under control of the processor (0101). Video data input (0106) is passed through a data compressor/decompressor (0112) that communicates the compressed video to the processor (0101) which then stores it in video storage (0105) that can also include personnel channels for class-based programmed recording. For playback purposes the stored video data (0105) is retrieved by the processor (0101) and passed through the data compressor/decompressor (0112) to provide video output (0107). A user interface (0108) interacts with the processor (0101) to control the scheduling, recording, and playback operations just discussed.

A key performance issue in this design is the fact that the processor (0101) represents a communications "hub" between the video storage (0105) and the compressor/decompressor (0112) engine that processes the video input (0106) and video output (0107). That is, the processor (0101) must be involved in all data transfers between the compressor/decompressor (0112) and the video storage element (0105). This significantly taxes the processor (0101) should the video storage (0105) be accessed remotely via a network (to permit playback of recorded shows on a remote node, for example) or in situations where channel guide information (0103) is being updated via the channel guide source (0109). Furthermore, the placement of the processor (0101) as a communication "hub" in this configuration limits the number of TV channel pairs that can be simultaneously recorded and displayed to one, as the processor (0101) lacks sufficient speed to handle hub data traffic for more than one compressor/decompressor data pair. Even in this limited situation, empirical data obtained from systems built using this configuration indicate that the system has bandwidth processing problems when both the compression and decompression paths (0112) are simultaneously engaged. While the use of direct memory access (DMA) and other hardware acceleration techniques have been used in an attempt to solve this bandwidth performance issue, the results in the prior art have not been entirely successful.

Tivo, Inc. Architecture (0200)

The ReplayTV, Inc. architecture is generally similar to that presented by Tivo, Inc. and illustrated in the drawing of FIG. 2 (0200) (derived and relabeled from U.S. Pat. No. 7,889,964) which represents the technology from ReplayTV, Inc. In this example, the Tivo, Inc. architecture takes an input stream (0211) and passes it through an input module (0201) that generates a compressed MPEG data stream (0212) that is then processed by a media switch (0202) that comprises memory (0204), hard disk (0205), and CPU (0206). Playback is achieved by emitting a MPEG data stream (0213) from the media switch (0202) into an output module (0203) for display (0214) to the user via a TV or other monitor.

The Tivo, Inc. architecture with respect to the data flow between the video storage hard disk (0205) and the input stream (0211) or output stream (0214) is identical to that of the ReplayTV, Inc. system described previously. Key here is the fact that the media switch (0202) comprising the CPU (0206) is still responsible as the data "hub" between the storage element (0205) and the resulting input (0211) and output (0214) modules.

MythTV Architecture (0300)

In addition to a variety of commercial digital DVRs as discussed above, there are a number of non-commercial "freeware" implementations of the Personal Video Recorder (PVR) concept. Typical examples of this are MythTV (http://www.mythtv.org), SageTV (http://www.sagetv.com), and Microsoft "Media Center Edition" of Windows XP (http://www.microsoft.com/windowsxp/mediacenter/default.mspx) or Microsoft Windows Vista (http://www.microsoft.com/ windowsvista/features/forhome/mediacenter.mspx) all of whose general concept is the use of standardized personal computer (PC) hardware in conjunction with add-on digital recording TV interface cards to perform the required digital capture of the TV information stream. A schematic of the approach taken by MythTV is generally illustrated in FIG. 3 (0300) and is described in detail in the text PRACTICAL MYTHTV—BUILDING A PVR AND MEDIA CENTER PC, by Stewart Smith and Michael Still, ISBN 978-1-59059-779-8, www.mythtvbook.com (2007).

Referencing the MythTV implementation in FIG. 3 (0300), the system generally comprises a backend processor (0310) to capture the TV program under control of a backend scheduler process (0311) (generally run under a LINUX operating system environment using a x86 based CPU system). TV program guide data (0312) is generally used to drive the recording process and this guide database (0312) may be manually triggered or loaded from the Internet (0301). The backend scheduler (0311) uses the TV program guide data (0312) to configure a TV tuner card (0313) that receives and digitizes TV programs from a TV network (0302). The output of this TV tuner card (0313) is an MPEG encoding of the audio/video contained within the TV network program. Thus, the TV tuner card (0313) both demodulates the TV program to audio/video and also compresses this information using MPEG or some other form of data compression. Once compressed, the backend scheduler (0311) moves the compressed TV program information to a hard disk (0314) under control of a SQL database for later retrieval and playback.

Once a TV program has been recorded and stored to disk (0314), playback occurs using one or more frontend processors (0320, 0330, 0340) that access the stored data (0314) (through the backend scheduler (0311)) for display using a frontend interface (0321, 0331, 0341) with associated TV display (0322, 0332, 0342) and infrared remote control (0323, 0333, 0343). In the simplest of configurations, one backend processor (0310) integrates the backend scheduler (0311) and one frontend display interface (0320) to form an integrated record/playback unit.

The problem with this approach is similar to that of the other systems discussed. Specifically, the backend processor (0310) provides the interface between the TV tuner card (0313) and the storage device (0314). Even with DMA data transfers between the TV tuner card (0313) and the hard disk storage (0314), the amount of processing power required by the backend processor (0310) is significant and quickly saps the processor's ability to handle other functions such as frontend (0320) playback, especially if more than one TV tuner card (0313) is used to simultaneously record TV programs from multiple (different) TV stations. As stated in PRACTICAL MYTHTV, " . . . if the machine you are specifying is going to run the backend, you need to be aware of how many video capture sources you intend to have, how many will be recording at a given time, and whether those sources implement video compression themselves . . . high definition requires much more processing power—typically 60 percent to 70 percent of a Sempron 2600+. This is mainly because the high definition video frames are each much larger than standard-definition frames." While PVR systems can be implemented using dual TV tuner cards, the burdens on the processor become unmanageable for systems with more than four tuners, even with integrated video compression on the TV tuner cards.

Commercial Prior Art Architecture Example/Limitations

Within the context of commercial DVR/PVR systems, typical commercial embodiments are significantly limited with respect to both the recording capability and expandability. An example of these limitations can be seen in the systems currently provided by TIME WARNER CABLE® brand cable TV service. Their WHOLE HOUSE DVR system, part of their SignatureHome™ series of cable TV STBs, generally comes with 500 GB of storage and can record approximately 150 hours of HD TV programming and 400 hours of SD TV programming (assuming two STBs, each STB being capable of storing approximately 75 hours of HD TV programming and 200 hours of SD TV programming).

This system permits programs recorded in one room to be retrieved and presented in another room. However, to achieve this performance requires a minimum of two STBs, one in each presentation room. Furthermore, while the system boasts of the ability to "Record up to four HD show simultaneously", this capability requires two STBs, each of which only has the capability to simultaneously record up to two programs. Thus, with this "state of the art" system architecture it requires one STB for each pair of TV channels to be recorded. Obviously, for situations that may require a dozen or more TV channels to be simultaneously recorded, the hardware expense for this problem solution approach would be cost prohibitive in most circumstances.

Video Encryption

It should be noted that within the context of all commercially available aftermarket PVRs that there is generally no methodology available to store encrypted video that is available over cable or satellite receiver. While there are DVR boxes associated with a wide variety of cable and satellite providers, there is no current methodology to record TV broadcast information from these sources outside the context of the content provided DVR hardware for use by the viewer at a later time. Stated in another way, without the hardware provided by the cable/satellite provider, there is no method of "time shifting" broadcasts received in these media if they are encrypted. While the viewer may be authorized to view the channels that are not displayed (but nonetheless received), there is at present no "time shifting" device to permit this functionality.

For example, a cable subscriber with a DVR STB wishes to record a baseball game starting at noon and also four other movies that start while the baseball game is active. Currently, without purchasing additional DVR STB hardware there is no methodology for the consumer to record all five of these TV programs, and there is no available hardware capable of recording all five shows within the same hardware storage/playback unit. This situation presents an especially significant hardship to sports fanatics who desire the ability to record a number of football or other broadcasts that occur simultaneously, or overlap in time such that recording these events sequentially with a conventional DVR/PVR would not be possible given the limitations of the current digital video recording arts.

Video Encoding

A significant problem in current DVR/PVR technologies is that the source RF data stream from which audio/video is extracted may be encoded in a wide variety of formats, including NTSC, PAL, SECAM, ATSC (over-the-air (OTA) broadcasts), quadrature amplitude modulation (QAM) (both in "clear" and "encrypted" formats), etc. While generally speaking the information bandwidth of these systems has been generally standardized, the CONTENT of the modulated RF signal has not. This generally requires a generalized DVR/PVR system to have multiple data signal decoders that interpret information from a given RF tuner/demodulator.

Deficiencies in the Prior Art

The prior art as detailed above suffers from the following deficiencies:

- The use of MPEG compression, while limiting the video storage requirements of standard DVR/PVR systems (standard video to 1-2 GB/hr; high definition video ~5 GB/hr) does not limit the data rate to a significant level to permit a traditional processor to handle more than approximately four channels of simultaneous TV recording.
- Traditional DVR/PVR systems are not capable of recording encrypted video streams (especially in the background), even if the user is authorized to receive and display these broadcasts. Thus, time shifting of these broadcasts is not possible with traditional DVR/PVR technologies.
- Traditional DVR/PVR systems rely on in-house local area networks to facilitate presentation of A/V program content stored on one STB to another STB residing in another room. The bandwidth of this local area network can be easily saturated with multiple STB-to-STB remote playbacks.
- Traditional DVR/PVR systems relying on one STB per A/V presentation device have substantial hardware overhead costs to implement multi-room DVR/PVR architectures.
- Traditional DVR/PVR systems have difficulty in properly switching recording channels when configured with internal tuners. This difficulty manifests itself in delays during the channel switch, such that often the beginning time portions of the newly selected channel may not be properly recorded. This problem is independent of the time-of-day clock accuracy with the DVR/PVR due to inaccuracies in EPG programming information.
- Traditional DVR/PVR systems are incapable of properly handling impromptu changes in the recording duration of sporting events, especially in situations where the sporting events "run over" their allotted time slots as indicated by EPG data. As a result, many DVR/PVR systems will "lose" closing minutes of sporting events that are extended into "overtime".
- Traditional DVR/PVR systems must contain video decoders tailored to each and every video source that is to be stored, requiring complex hardware and/or software to interpret the RF data stream prior to conversion to an MPEG compatible storage data stream.
- PVR systems utilizing embedded MPEG compression generally require significant processor speeds (>1 GHz) to support video output in addition to high memory requirements (>1 GB) and high end video output display card requirements (~256 MB memory).
- While data storage capacities/transfer rates for hard drives has increased exponentially in the last decade, processor speeds have not increased at a corresponding rate, resulting in a disparity between processor speed and storage capacity/speed that has not been used to advantage by traditional DVR/PVR systems.

While some of the prior art may teach some solutions to several of these problems, the core issue of managing multiple video storage/retrieval streams and their associated data storage has not been addressed.

OBJECTIVES OF THE INVENTION

Accordingly, the objectives of the present invention are (among others) to circumvent the deficiencies in the prior art and affect the following objectives:

(1) Provide for an audio/video storage/retrieval system and method permitting storage/retrieval of multiple audio/video streams simultaneously.
(2) Provide for an audio/video storage/retrieval system and method that reduces the CPU overhead in the implementation of DVR/PVR systems.
(3) Provide for an audio/video storage/retrieval system and method that reduces hardware complexity in the implementation of DVR/PVR systems.
(4) Provide for an audio/video storage/retrieval system and method that can store RF modulated audio/video irrespective of the signal encoding of the audio/video encoding.
(5) Provide for an audio/video storage/retrieval system and method that leverages the high definition display technology of existing high-definition TVs and Set Top Boxes (STBs).
(6) Provide for an audio/video storage/retrieval system and method that advantageously utilizes current and future high speed disk technologies.
(7) Provide for an audio/video storage/retrieval system and method that properly records sporting events, irrespective of their duration or change in schedule.
(8) Provide for an audio/video storage/retrieval system and method that properly records and is immune to minor changes in the presentation time of media content.
(9) Provide for an audio/video storage/retrieval system and method that advantageously utilizes pass-thru disk drive controller (PTDDC) technology to access attached "farms" of disk drives to provide inexpensive and extensible storage for audio/video captured by the storage/retrieval system/method.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Exemplary System Application Overview (0400)

The present invention and typical system application as applied to an audio/video storage/retrieval system is generally illustrated in FIG. 4 (0400). The system herein generally described is targeted in this exemplary embodiment to implement a generalized DVR/PVR system utilizing a processor (0401) having memory (0402), user interface (0403), and I/O ports (0404) that may also incorporate a network interface (0405). Storage for DVR/PVR system is via traditional hard disk drive (0406) having standard computer host bus adapter (HBA) interfaces (IDE,EIDE,PATA,SATA, etc.).

Normal DVR/PVR implementations utilize a hard drive bus interface (0407) via a parallel or serial HBA interface cable to the hard drive data storage device (0406). This traditional disk interface (0407) is eliminated (0417) by the present invention architecture and replaced by an integrated audio/video storage retrieval system (0510) that acts as an interface between the processor (0401) and the storage element (0406) via series insertion using two cable assemblies (0411, 0416) that are compatible with existing drive interface requirements. The purpose of this in-line insertion of the invention system (0510) is to permit processor (0401) access to the audio/video storage (0406) in a transparent manner while simultaneously permitting high bandwidth access to the storage element (0406) for the purposes of audio/video storage/retrieval without the need for any processor intervention. The topology presented in this preferred DVR/PVR implementation anticipates that the audio/video storage retrieval system (0510) can incorporate capability to record multiple audio/video/TV programs simultaneously without significant processor loading (0401).

Exemplary System Architecture (0500)

The block diagram (0510) illustrated in FIG. 4 (0400) that represents the application functionality of the present invention can be illustrated in greater detail via the block diagram generally illustrated in FIG. 5 (0500). The system herein (0510) operates in the context of receiving a broadband source (0501) and/or one or more audio/video source(s) (0502) within the context of an audio/video storage/retrieval system. If a broadband source (0501) is input, it is passed through a baseband conversion (0511) element to retrieve the raw audio/video information associated with the audio/video/TV channel selected. An A/V source selector (0512) selects either the downconverted broadband source (0501) demodulated by the baseband converter (0511) or the raw audio/video source(s) (0502).

The output of the A/V source selector (0512) is converted to digital using an A/D converter (0513) and presented as the input to a storage MUX (0514) that directly interfaces to a storage device (0503) via a standard disk interface cable (0509). Data from the A/D conversion (0513) is written directly to the storage device (0503) without the intervention of the CPU processor (0504). Access to the storage device from the CPU processor (0504) is through the dual port control logic (0518) that permits the entire audio/video storage/retrieval system (0510) to appear as if it were a single disk drive to the host CPU processor (0504).

Playback of the recorded A/V data is initiated by the control logic (0518) that initiates reads from the storage device (0503) by the storage MUX (0514). The resultant data read from the storage device (0503) is then presented to a D/A converter (0515) that then modulates (0516) the reconstructed baseband signal information to a suitable RF signal that is then presented to an A/V target selector (0517). The output of the A/V target selector (0517) is then presented to an output device (0505) via an audio/video decoder (cable box, set-top box, etc.) (0520). Note in some circumstances this audio/video decoder (0520) is absent, as in the case where the broadcast source is unencrypted cable or over-the-air TV broadcast information. Playback of the stored data (0503) may also avoid RF modulation in some circumstances as depicted by information flow lines (0507) that indicate the raw analog data obtained from the D/A converter (0515) may be selected in some circumstances by the A/V target selector (0517) for direct display to the output device (0505).

The exemplary architecture illustrated in FIG. 5 (0500) also illustrates how the present invention differs from the prior art in its handling of A/V information. The prior art teaches that all A/V information should be converted to digital using MPEG compression in order to reduce the amount of data that the CPU (0504) must process, thus limiting the CPU (and associated memory/bus) overhead in handling the data stream. The present invention breaks from this methodology by directly digitizing the baseband information contained within the TV (or other A/V source) channel and storing this information "in the clear". Reconstruction of this baseband signal by the D/A converter (0515) reconstructs the information with sufficient bandwidth to permit the STB (0520) to properly interpret the signal as if it were being currently broadcast. Thus, even though the signal might be encrypted, it can still be played back on the STB because the information needed to enable decryption has not been tampered with in the data stream.

Note that this architecture also presents several other benefits, one of which is the ability to view "live" broadcasts from the broadband source (0501) without any form of storage or time-shifting (by instructing the A/V target selector (0517) to connect the broadband source (0501) to the audio/video decoder (0520)). Additionally, the broadcast may be "time-shifted" as is done with traditional DVR/PVR systems by taking the broadband source (0501) and processing it with baseband conversion (0511) followed by A/D conversion (0513), storage (0514, 0503), and subsequent D/A conversion (0515), RF modulation (0516), and presentation to the STB (0520). This architecture also permits the STB (0520) to act as an A/V source (0502) to the system in a traditional sense both by permitting composite video and/or modulated RF to be captured by the system (0510) from the STB (0520) A/V output (0523) as if it were some other independent A/V source input.

The user interface (0506) for this architecture remains remarkably intact, as the main functions of the system (0510) are controlled via a single standardized hard disk interface (0508) that is connected to the processor. Software to control this interface is easily integrated within the framework of existing DVR/PVR systems.

While the exemplary application context detail of FIG. 5 (0500) illustrates a single baseband conversion (0511), A/V source selector (0512), A/D converter (0513), D/A converter (0515), modulator (0516), the system may be expanded to include a large number of these components to support any number of A/V sources for storage/retrieval. One skilled in the art will recognize that the A/D converter (0513) and D/A converter (0515) may be multiplexed among a number of A/V source inputs/outputs to optimize the I/O structure of the system. Generally speaking, though, the optimal system comprises a number of possible sources for recording and a single output data stream.

Method Overview (0600)

The present invention method can be generally illustrated by the preferred exemplary embodiment illustrated in FIG. 6 (0600). The general steps of this method comprise the following:

Identifying an A/V source input (0601);
Determining if the A/V source is baseband, and if so, proceeding to step (4) (0602);
Convert A/V input to baseband via mixer (0603);
Convert the baseband A/V signal to digital using an A/D converter (0604);
Store the digitized A/V data on a disk drive using a storage multiplexer (0605);
Retrieve digitized A/V data on a disk drive using a storage multiplexer (0606);
Convert the retrieved digitized A/V data to analog using a D/A converter (0607);
RF modulate the converted D/A A/V data to generate a broadband signal (0608);
If a set-top-box (STB) is not present, proceed to step (11) (0609);

Present the RF modulated broadband signal to the STB (0610);

Display the RF or STB output on a display device/TV (0611).

This general method as illustrated in FIG. 6 (0600) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
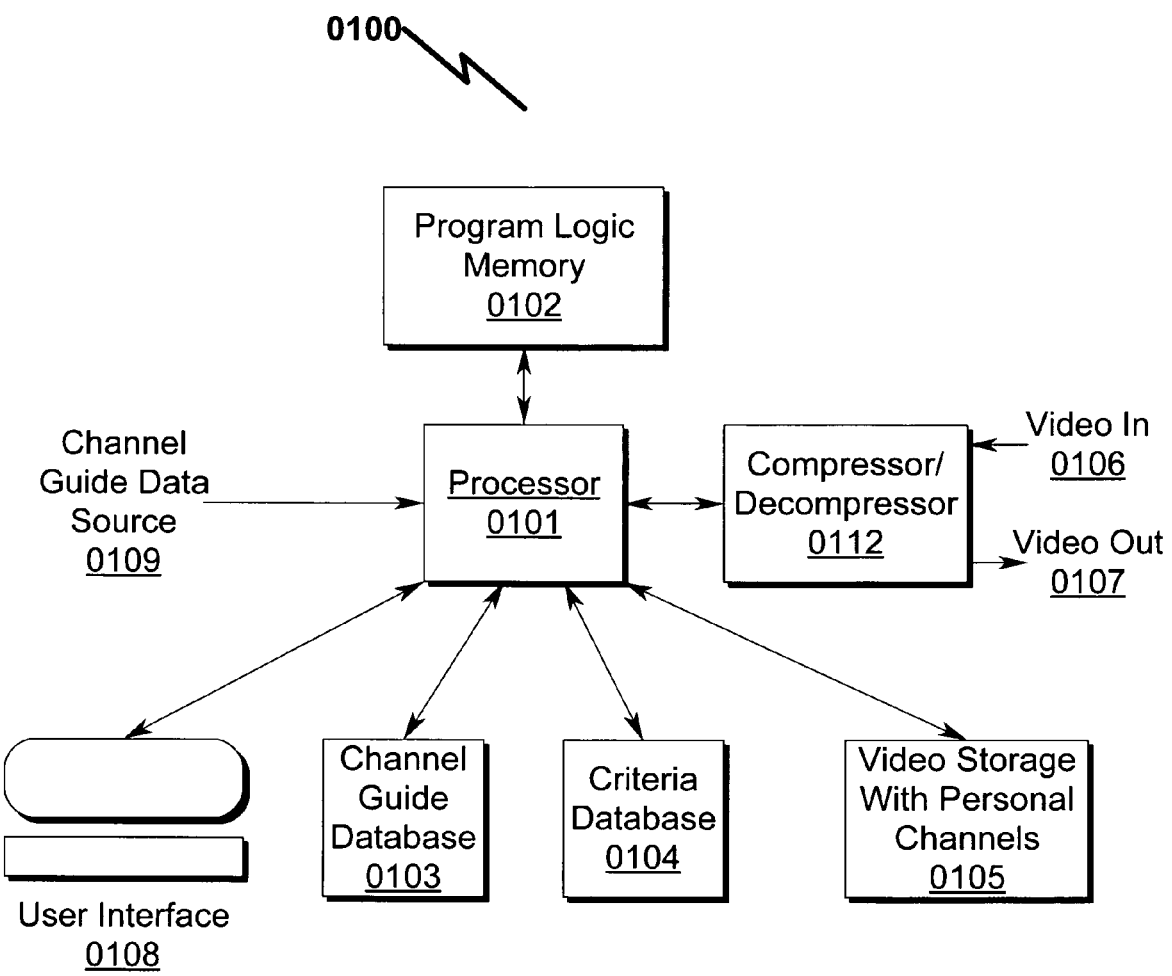
FIG. 1 illustrates a prior art DVR system manufactured by ReplayTV, Inc.
Figure 2:
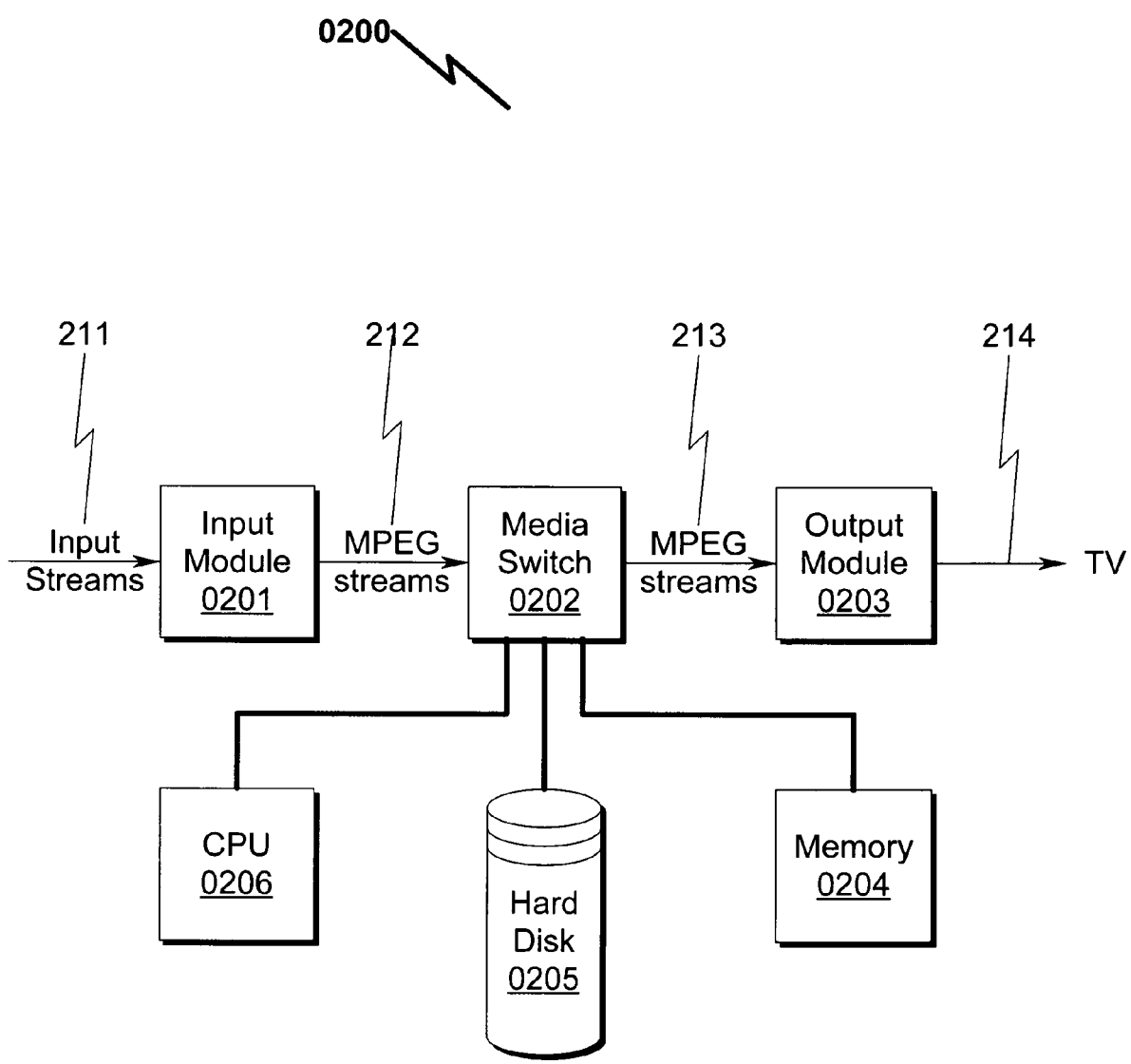
FIG. 2 illustrates a prior art DVR system manufactured by Tivo, Inc.
Figure 3:
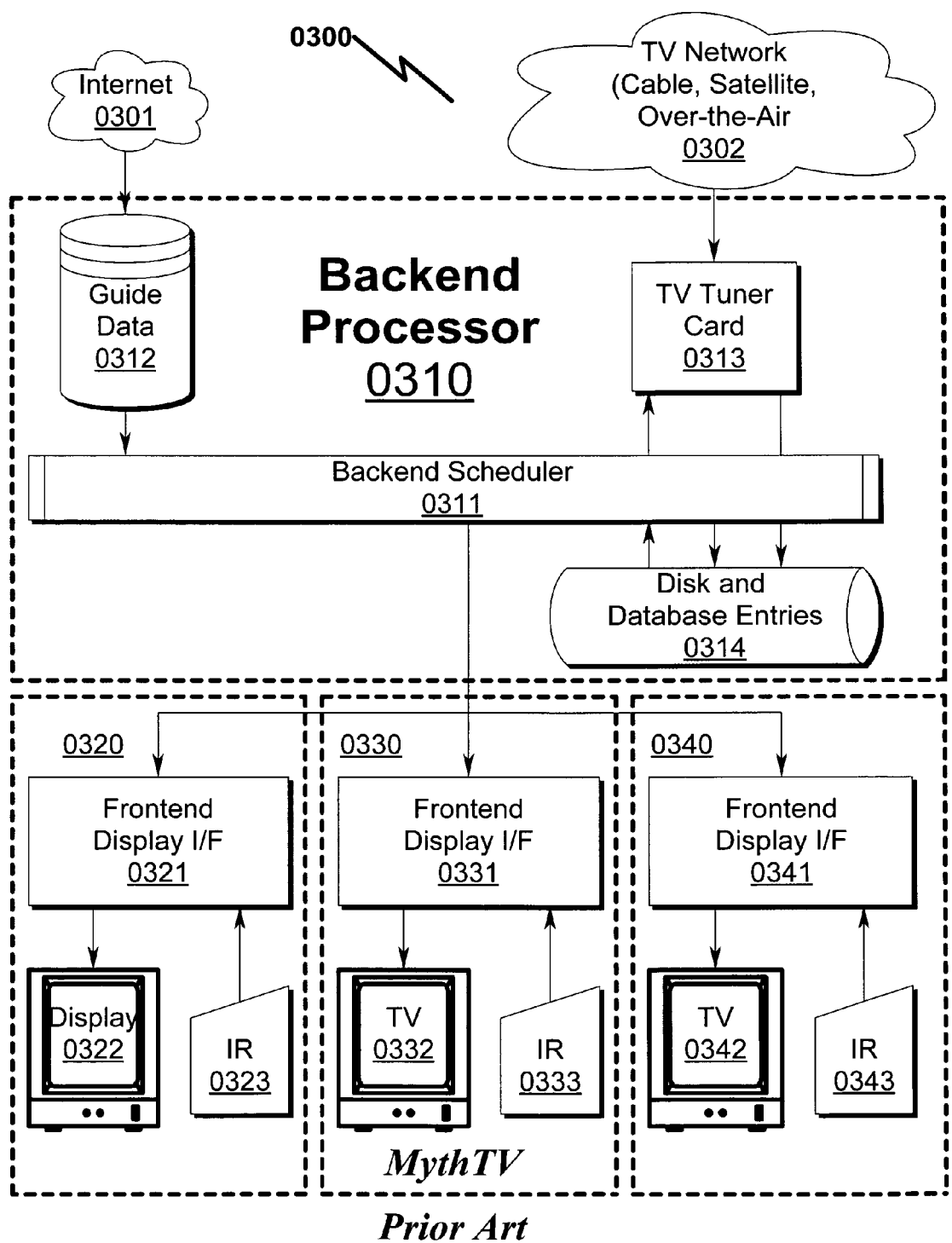
FIG. 3 illustrates a prior art PVR system architecture implemented by MythTV systems.
Figure 4:
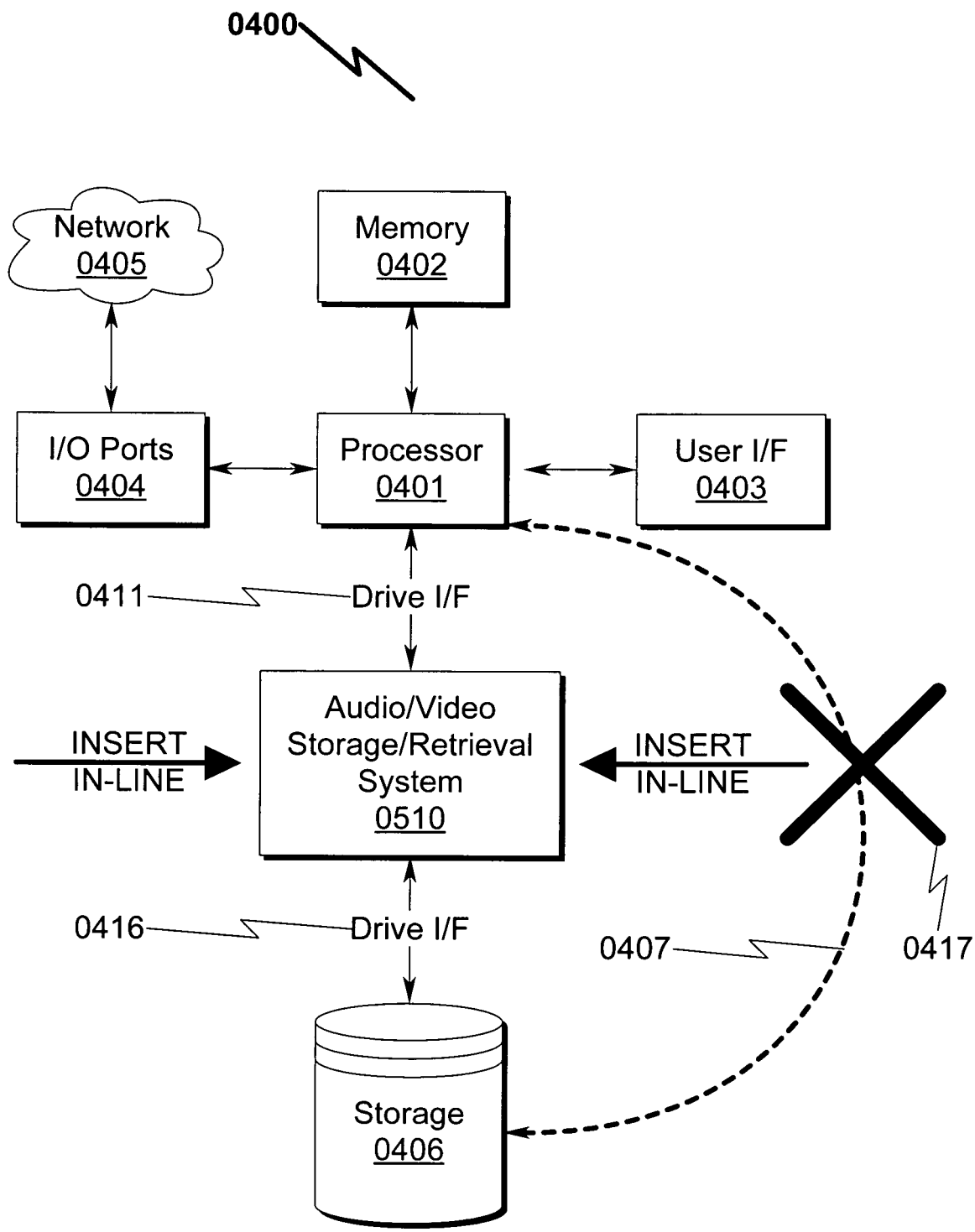
FIG. 4 illustrates an exemplary system application context for the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an AUDIO/VIDEO STORAGE/RETRIEVAL SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Bandwidth Not Limitive

The present invention has as one of its features the baseband conversion of RF modulated audio/video information. This baseband conversion is generally followed by a bandwidth limiting function in which the baseband signal is bandwidth limited before analog-to-digital conversion is performed. Many preferred exemplary embodiments of the present invention utilize a 6 MHz bandwidth limiting function, however the present invention is not limited to this particular bandwidth.

Tuners Not Limitive

The present invention in many preferred exemplary embodiments utilizes as one of its features the use of multiple broadband-to-baseband tuners to downconvert broadband RF A/V content to baseband signal frequencies. While many preferred exemplary embodiments of the present invention may utilize more than one tuner to accomplish this task as in a tuner array, no limitation is made on the number of tuners or tuner arrays that may be incorporated within a given implementation of the system or method shown herein.

Storage Device Not Limitive

The present invention in many preferred exemplary embodiments utilizes hard disk drives as the main storage element for data storage. However, the present invention makes no limitation on the type of data storage device that may be utilized in a given embodiment of the present invention.

Additionally, note that while current disk drive technologies can support sustained data transfer rates in excess of 150 MB/s, resulting in a maximum supported tuner array size of 25 per hard drive, the present invention makes no limitation on the potential number of tuners that may be associated with a given storage device.

Storage Architecture Not Limitive

The present invention in many preferred exemplary embodiments utilizes storage architectures implementing SATA interface as the main storage architecture communication media. The present invention also anticipates the use of Pass-Thru Disk Drive Controller (PTDDC) storage extension architectures as described in the United States patent application for DATA STORAGE ARCHITECTURE EXTENSION SYSTEM AND METHOD specified above and incorporated herein by reference. This data architecture extension (DAX) methodology in some preferred embodiments permits large extensible data storage arrays to be constructed within a single file system/disk interface context, a feature that is extremely useful in situations where it is desired to minimize initial hardware costs and also permit large extensions of baseline storage capabilities in the future.

Host Bus Adapter Not Limitive

The present invention in many preferred exemplary embodiments utilizes a HBA interface to connect to the host computer system and a similar disk drive interface to communicate with an attached disk drive. The system/method make no limitations on the specifics of these HBA interfaces. However, some preferred embodiments utilize SATA class HBA interfaces.

Note also that the hardware associated with the present invention may also incorporate Pass Thru Disk Drive Controller (PTDDC) storage extension architectures as described in the United States patent application for DATA STORAGE ARCHITECTURE EXTENSION SYSTEM AND METHOD specified above and incorporated herein by reference. The use of this architecture in conjunction with some preferred embodiments of the present invention permit parallel storage of A/V information to a variety of disk drives simultaneously without the intervention of the host computer. This architecture also permits any limitation associated with a single data acquisition component of the system (for example, A/D converter bandwidth) to be executed in parallel among a plethora of PTDDCs incorporating the requisite data acquisition components. This permits, for example, a system with a limitation of programming 16 A/V channels per "converter" to be chained (via the use of PTDDC technology) with a plethora of other "converters" to achieve an essentially unlimited capture bandwidth, with each "converter" connected to and recording/retrieving data from a PTDDC-attached disk drive. A significant advantage of this architecture when using a chain of "converters" is that the PTDDC chain presents a single HBA interface to the host computer system.

General Invention Architecture

Figure 7:
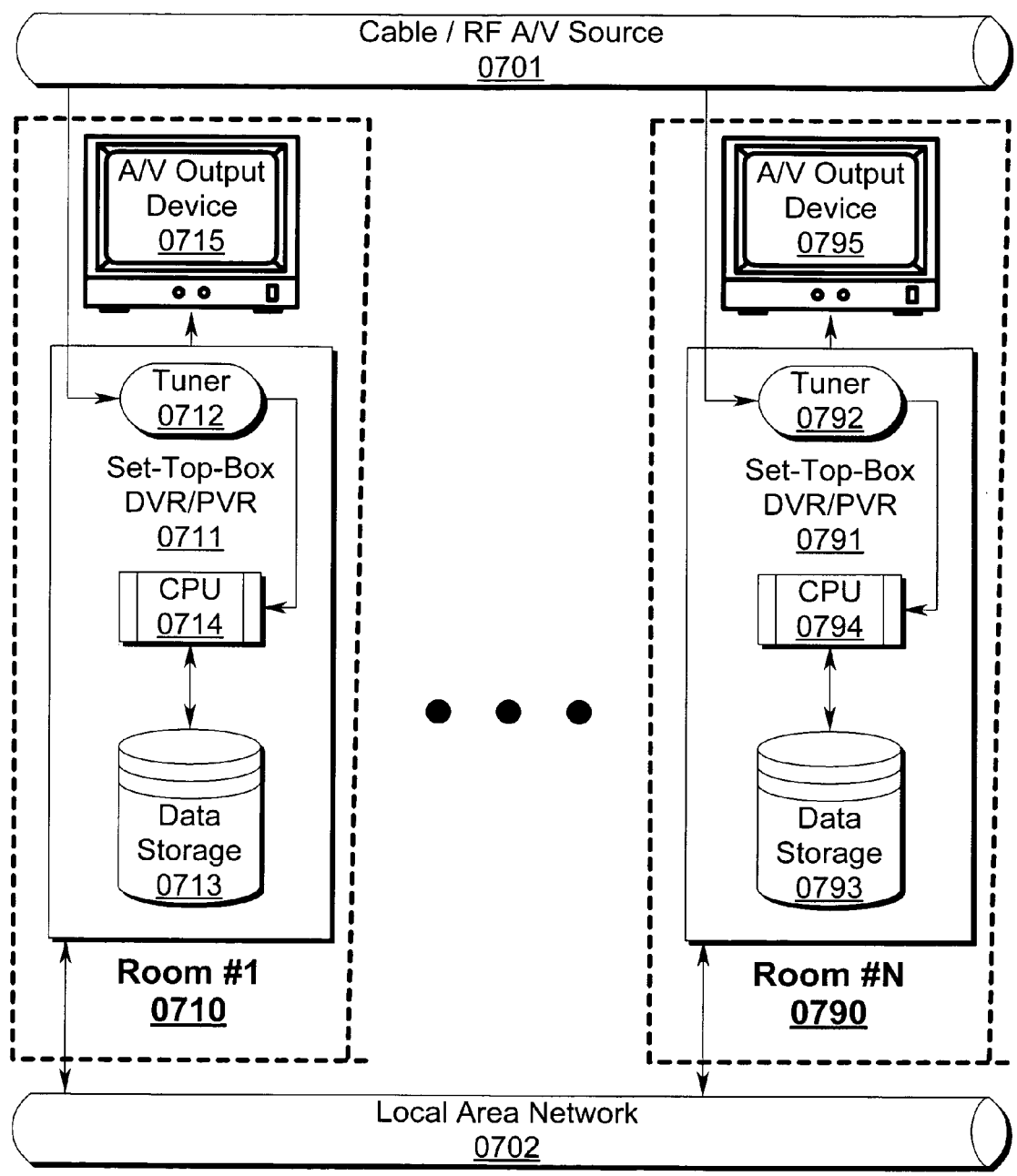
FIG. 7 illustrates a prior art implementation of multi-room DVR/PVR functionality and connectivity.
Figure 8:
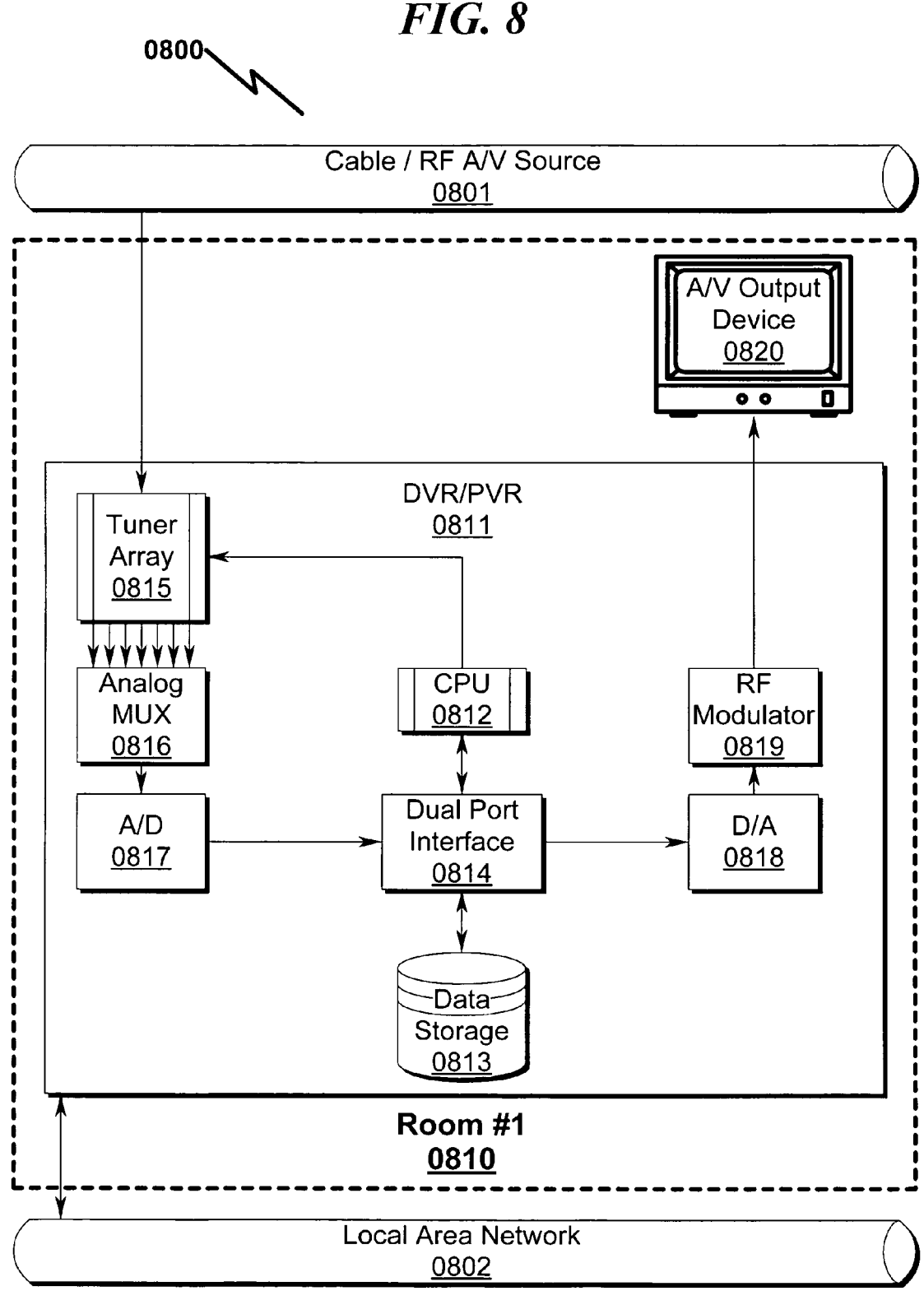
FIG. 8 illustrates a present invention implementation of multi-room DVR/PVR functionality and connectivity.

The architectural aspects of the present invention as contrasted with the prior art may be generally illustrated by comparing prior art DVR/PVR implementations as generally illustrated in FIG. 7 (0700) with the general architecture of the present invention illustrated in FIG. 8 (0800).

Prior Art Architecture (0700)

Referencing the prior art configuration of FIG. 7 (0700), it can be seen that in a multi-room DVR/PVR configuration (0710, 0790), each room is configured with a DVR/PVR system (0711, 0791). Within each DVR/PVR system (0711, 0791), a separate tuner operates to retrieve, demodulate, and decode A/V information from a cable/RF A/V source (0701). This information is MPEG encoded and stored on local data storage (0713, 0793) under control of a local computer system (0714, 0794) within the DVR/PVR system (0711, 0791). The MPEG data is subsequently decoded and presented to an A/V output device (0715, 0795) for presentation to a user.

Generally speaking, the number of separate tuners (0712, 0792) is limited in each DVR/PVR system (0711, 0791) because it is impossible to encode and transfer data under computer control from a large number of tuner subsystems to a data storage device (0713, 0793). As such, these systems are generally constructed to utilize a local area network (0702) to transfer stored A/V information stored on one storage device (0713) from one room (0710) to another room (0790) for presentation on an alternate A/V output device (0794).

The problem with this approach is that the bandwidth of the local area network is often not sufficient to support more than one remote hosting of a given A/V program. This limitation, coupled with limited number of tuners that are possible with a given DVR/PVR configuration, means that broad recording of content over dozens of channels simultaneously is not practical using current DVR/PVR hardware and software techniques.

Present Invention Architecture (0800)

A general architecture overview of the present invention is illustrated in FIG. 8 (0800), wherein only one room incorporating a DVR/PVR system is shown for clarity. Here we see that each room (0810) is still configured with an A/V output device (0820), but the configuration of the DVR/PVR (0811) is quite different. The DVR/PVR system (0811) still comprises a CPU (0812) and data storage device (0813), but contains an additional dual port interface (0814) that permits simultaneous access of the data storage device (0813) by both the CPU (0812) and a digital data stream comprising A/V data that has been obtained from a cable/RF A/V source (0801), simultaneously downconverted to baseband signals by a tuner array (0815), selected for digitization by an analog multiplexer (0816), and digitized by an A/D converter (0817). Data may also be retrieved automatically from the data storage device (0813) via the dual port interface (0814) and converted to baseband analog via a D/A converter (0818) and upconverted to RF using a modulator (0819) for presentation to the A/V output device (0820). Note that in this generalized configuration the A/V output device may comprise a set-top cable box or other device capable of interpreting the upconverted RF modulated A/V information.

The advantages to this DVR/PVR architecture are many, and may include any or all of the following:
  No MPEG processing is performed in any part of this system. Rather than using MPEG as a methodology to reduce the data storage requirements as is done in the prior art, the present invention stores all downconverted information "in the clear", without the need for any hardware/software intensive translation or interpretation.
  The tuner array (0815) in this configuration is extremely simple and cost effective to implement, and comprises only variable frequency carrier sources and a mixer/band-pass-filter combination to downconvert a cable/RF A/V source that might contain thousands of channels into a selected number of analog streams that are then selected by a multiplexer (0816) for conversion to digital data.

The data stream created by the A/D converter (0817) in this configuration can be directly written to the data storage device (0813) for later retrieval and conversion to RF via a D/A converter (0818) and RF modulator combination (0819). There is no need to interpret the data, as this is the responsibility of the A/V output device (0820). Should the stored data incorporate any form of encryption, the responsibility for properly interpreting this lies in the A/V output device (0820), not the DVR/PVR (0811).

Rather than relying on a local area network (0802) to transfer recorded A/V information from one room (0810) to others, the present invention optimally operates on the premise that each DVR/PVR (0811) should be able to record a LARGE number of A/V sources (0801) simultaneously to a local storage device (0813) and then play back the recorded information LOCALLY, rather than relying on the local area network (0802) for transfer of remotely recorded A/V media information. Of course, the present invention does permit playback of remotely recorded A/V media information, but in many circumstances the ability to locally record A/V programming is a superior approach to the problem of A/V media access.

The ability to integrate a tuner array (0815) into the DVR/PVR (0811) architecture greatly simplifies both cable management for these systems as well as overall operation of these systems. For example, rather than separately programming 16 individual DVR/PVR systems to record TV programs sourced from a cable provider, the present invention permits a single PVR/DVR (0811) to program the tuner array (0815) via the CPU (0812) to record programs as needed off of a single cable/RF A/V source (0801).

Cable and data management for the present invention is superior to that of existing DVR/PVR systems because the present invention only requires one cable/RF A/V source (0801) input and a single A/V output device (0820) connection, with the remainder of the system connections involving the pass-thru dual port interface (0814) between the existing CPU (0812) and data storage device (0813).

The dual port access (0814) to the data storage device (0813) permits a transparent "hands off" approach to the transfer and storage of data by the DVR/PVR system (0811). The data storage device (0813) may incorporate a standard file system under control of a conventional operating system running on the CPU (0812), with the addition that file locations on the storage device (0813) may be identified by starting logical block number/extent addressing (LBA) and used by the dual port interface (0814) to store raw digitized A/V data from the A/D converter (0817) based on the selected tuner array selection (0815) configuration. Thus, the CPU (0812) under control of an operating system may format and manipulate the data storage device (0813) as if it were a normal native file system structure. This control might include allocation of storage for A/V content based on an electronic program guide (EPG). Once this storage is allocated, the tuner array (0815) may be programmed to select and digitize the A/V content at the correct time and place this digitized content from the A/D converter (0817) directly in the pre-allocated file resident on the native operating system file system residing on the data storage device (0813). Once this is accomplished, the A/V digitized content is available via the local area network (0802) for other DVR/PVRs to present to their associated A/V output devices, or for the local DVR/PVR system (0811) to present to the locally attached A/V output device (0820). This architecture leverages the network file access capabilities in conventional operating systems to promote remote playback of recorded A/V media recordings.

Since the present invention in this context is somewhat "filesystem aware" in that it can cooperate with the on-disk file system data structures in placement of the digitally recorded A/V media data, it overcomes a significant interoperability problem present in most DVR/PVR systems. Conventional DVR/PVR systems integrate the data manipulation function associated with A/V media recording. The present invention in many preferred exemplary embodiments bifurcates this functionality and provides a common storage element (the on-disk file structure) in which the CPU (0812) and DVR/PVR functionality can communicate via the stored A/V media program.

One skilled in the art will no doubt find other examples of advantages of the present invention architecture as generalized in FIG. 8 (0800) when compared with the prior art topology of FIG. 7 (0700). In many circumstances the present invention permits some functionality (such as simultaneous multiple channel recording) at levels not possible with any known prior art DVR/PVR architecture.

Fixed Time-To-File Sizing Operation

One significant advantage of the present invention with relation to the storage of A/V content in comparison to the prior art is that the storage rate in realtime A/V media content to data storage consumed may be constant. In all conventional prior art A/V DVR/PVR systems, the use of MPEG or other compression techniques means that while there may be an upper limit place on the encoding rate, there is no prescribed linear relationship between A/V content temporal positioning and data content stored. For this reason, it is not possible to precisely traverse a MPEG compressed data stream and determine (outside of internal timestamp encoding) when a particular A/V content frame is active.

In contrast, a constant encoding methodology in the present invention permits precise location of A/V content if the file starting point has a known initialization timestamp. This is because by raw encoding the A/V content, the exact position of any A/V entity always has a linear relationship with the start of the file storage stream. This overcomes the problem with many prior art DVR/PVR systems in which the audio and video can become desynchronized. If the raw A/V information is stored at a fixed encoding rate, then the audio and video is by definition synchronized and will remain so throughout the entirety of the stored data stream.

Note that the use of fixed encoding rates may greatly simplify the on-disk storage allocation structures associated with storing A/V information. Rather than having to deal with arbitrary block boundary allocation methodologies that are required with MPEG encoding schemes, the disk structure may be allocated in block quantities corresponding to multiples of 15 minutes, such as 30 minutes or 60 minutes for common A/V programs. This fixed time allocation methodology reduces disk fragmentation and permits reallocation/ rewriting of program recording blocks without the overhead normally associated with arbitrary MPEG storage methodologies.

Finally, the use of fixed time-to-file sizing improves the reliability of any commercial-skipping software integrated into the DVR/PVR, as blanking-interval time delineated searches for fixed period commercials (15-second, 30-seconds, 1-minute, etc.) can be easily calculated and detected. Given the non-linear time compression of MPEG-based prior art systems, this capability provides a significant reliability and performance improvement as compared to the prior art.

Tuner Array Configuration (0900)

Figure 9:
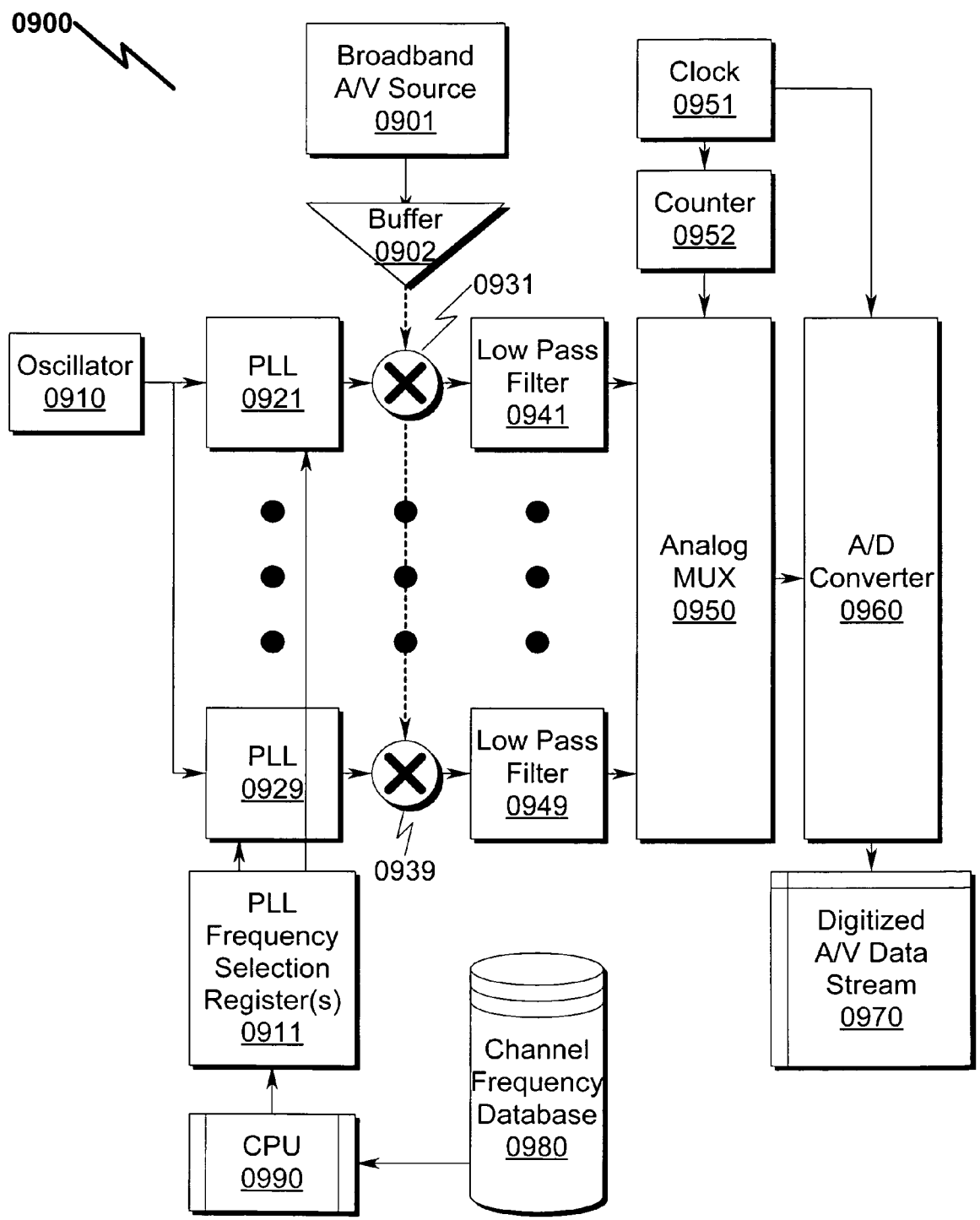
FIG. 9 illustrates an exemplary system block diagram of a preferred exemplary embodiment of the present invention incorporating multiple broadband tuners and integrated data conversion and storage.

The present invention in many preferred exemplary embodiments may incorporate a tuner array configuration as generally depicted in FIG. 9 (0900). In many of these preferred invention embodiments, a plethora of tuners may be incorporated into the system to permit simultaneous recording of multiple A/V programs at a quantitative level not possible with that of prior art DVR/PVR architectures.

Referencing FIG. 9 (0900), the tuner array configuration generally utilizes a broadband A/V source (0901) that may have thousands of A/V channels of A/V media content. This broadband A/V source (0901) is generally buffered (0902) before being presented to the remainder of the tuner array configuration.

The tuner array configuration generally includes an oscillator (0910) that is utilized by a plethora of phase-locked-loops (PLLs) (0921, 0929) that generate various frequencies used to downconvert the broadband A/V source (0901) into individual A/V channels via the use of a corresponding plethora of mixers (0931, 0939) and corresponding plethora of low pass filters (0941, 0949). The result of this mixing and low pass filtering operation is a band-limited baseband signal corresponding to the A/V content of a particular A/V media program. These baseband signals are used as input to an analog multiplexer (0950) that selects a given signal for conversion to digital by an analog-to-digital converter (0960), resulting in a digitized A/V data stream (0970).

The PLL array (0921, 0929) is generally configured using a PLL frequency selection register bank (0911) under control of a CPU (0990) that uses a channel frequency database (0980) to determine the necessary frequency offset necessary to convert the broadband A/V source individual media channel to a baseband signal with the proper bandwidth.

The utilization of the analog multiplexer (0950) in conjunction with the A/D converter (0960) permits the low pass filter outputs (0941, 0949) to be sequentially sampled and converted to digital using a high speed analog-to-digital converter (0960). Thus, if the PLL array (0921, 0929) consisted of eight (8) PLLs, corresponding mixers (0931, 0939) and low pass filters (0941, 0949), then this information could be sequentially transformed to digital data for presentation to the local storage unit as a digitized A/V data stream.

In some preferred embodiments the digitized A/V data stream (0970) may be demultiplexed prior to transfer to the data storage device in the DVR/PVR system for placement in individual pre-allocated files within the storage device operating system file structure. Other embodiments may simply dump the serialized digitized A/V data stream on the storage device and perform the deserialization of the data upon later retrieval of the data from the storage device.

The channel frequency database (0980) in many embodiments provides information on the carrier frequency associated with a given A/V broadband media channel. This information is used to generate synthesized PLL frequency that is mixed with the common A/V broadband input source (0901) to generate the various baseband signals corresponding to the A/V channels that have been selected from the encompassing broadband source (0901).

While there are many methodologies to accomplish this broadband-to-baseband conversion, the present invention anticipates that individual mixers (0931, 0939) will be driven by individual buffer amplifiers (0902) to achieve the required downconversion. However, some preferred exemplary embodiments anticipate that the mixers may be configured in a cascading serialized connection wherein the output from one mixer is fed into a subsequent mixer and this input is mixed with a PLL frequency less than would normally be necessary. In other words, the output of a given mixer contains a baseband channel that is low pass filtered to extract this channel information, but the result of this mixing operation also includes higher bandwidth channels that can be downconverted by subsequent mixers (0931, 0939) in the chain, provided that the PLL frequency synthesis is appropriately modified to generate a channel mixing frequency reduced by the sum of all previous mixing operations in the chain.

One skilled in the art will recognize that the clock (0951) and counter (0952) illustrated may take a wide variety of forms, and may be initialized/operated under computer control to optimize the data conversion process that synchronizes data collection from the broadband A/V source (0901) and coordinates the conversion of this information into digital format by the A/D converter (0960) through the analog MUX (0950).

General Storage/Retrieval System Data Flow (1000)

The present invention may in some embodiments be utilized in a variety of ways to store and/or retrieve audio/video content. The general storage methodologies as applied to an audio/video storage retrieval system (AVSR) are graphically illustrated in FIG. 10 (1000) and may be described as follows:
Recording Set-Top Box (STB) Current A/V Output In this configuration, typically a cable sourced RF A/V source (1010) is utilized as a broadband source (1011) for input to the AVSR (1001). This source is switched internally to the RF Modulated A/V output of the AVSR (1001) for input to the STB (1013). The STB (1013) processes this RF input as it would from the cable source (1010) and produces an A/V output that is interpreted as an A/V source (1012) to the AVSR (1001). Note that in some circumstances the STB RF modulates this A/V signal (typically via video channels 2, 3, or 4), and in these circumstances the STB output may be interpreted as another broadband source (1011) for input to the AVSR (1001). The raw A/V source is stored on the storage device (1002) as described previously using a dual port disk access mechanism that permits a computer system (1021) and AVSR recording system simultaneous access to the recorded program data. The A/V data may be simultaneously displayed on an A/V output device (1003) and/or transmitted over the local area network (1020) via a computer system (1021) to another AVSR (1001) system for remote presentation to the user.
Record/Playback of Raw Broadband A/V Content Thru Set-Top Box (STB)

This configuration overcomes the inherent limitations in many STB (1013) systems in that they typically limit the number of simultaneous recorded programs to four or less. This limitation is intimately tied to the use of MPEG compression to represent the A/V data stream to be recorded within prior art DVR/PVR systems. Processing limitations within this prior art framework generally cannot be overcome without the use of additional CPUs associated with the MPEG compression and data transfer operations.

The present invention overcomes these deficiencies in the prior art by incorporating a plethora of integrated broadband tuners in the AVSR, with the output of these tuners being multiplexed to an A/D converter subsystem and associated dual-port storage access as described previously. The general information flow for the present invention in this configuration is as follows. Typically a cable sourced RF A/V source (1010) is utilized as a broadband source (1011) for input to the AVSR (1001). This source is passed through a tuner array in the AVSR (1001) that selects particular broadband channel(s) for recording and converts each of these to a bandwidth limited baseband signal. These baseband signals are then individually selected and digitized for presentation to a dual port interface to a storage device (1002). It is important to note that these recorded baseband signals may incorporate some form of encryption or other encoding such that only a STB (1013) is capable of properly decoding this information in a form suitable for presentation on an output device (1003). The particular content of these baseband signals is irrelevant in this context, as long as it may be interpreted by the STB (1013).

For playback of the A/V information retained on the storage device (1002), the stored data is retrieved via the dual port storage interface, passed through a D/A converter, and RF modulated for presentation to the STB (1013). The STB output may then be viewed as an A/V source (1012) to the AVSR (1001) and then internally output to the display device (1003) via a presentation interface.

Since the user (1022) generally only requires presentation of a single A/V stored program at a time, the STB (1013) can be used as the interpretation decoder to unencode/decrypt (transcode) the raw stored A/V information that has been saved on the storage device (1002). By removing the STB (1013) from the storage portion of the DVR/PVR functionality, the number of A/V channels that can be simultaneously stored is not limited by the STB (1013) hardware configuration.

Additionally, note that raw stored A/V data may be transmitted over a local area network (1020) to another remote AVSR system (typically in another room) for replay through a STB connected to the remote AVSR. A significant benefit of this architecture is that the complexity of the STB can be significantly reduced, resulting in lower monthly rental charges from the cable or other media provider. This is especially true in situations where multiple rooms within a single structure must be supported by a STB per room.

Background Conversion of Encoded A/V Content Thru Set-Top Box (STB)

In many circumstances, the present invention anticipates scenarios in which multiple rooms must be serviced with A/V content. Traditional DVR/PVR systems integrated into STBs are generally expensive solutions to this problem, as the monthly rental charges for these units quickly exceed the actual hardware cost of these units. What the prior art does not address is scenarios in which multiple rooms within a given structure must be serviced by a single STB, and optimally a STB of lowest cost and complexity. Thus, the present invention in some preferred embodiments anticipates a scenario in which the user subscribes to "BASIC CABLE" or some other broadband subscription service with a very simple (and inexpensive) STB, with this STB being augmented via numerous AVSR systems to provide DVR/PVR service throughout the structure in each of the various serviced rooms.

In this exemplary configuration, the user subscribes to cable (1010) or some other broadband service (1011) with a very basic STB (1013). Multiple rooms within a given structure may be supported with various AVSR (1001) systems, with only one of the rooms necessarily incorporating a STB (1013). Generally speaking, most rooms within a given structure requiring A/V programming support will have access to a cable/RF A/V source (1010) and possibly a local area network (1020). The architecture of this exemplary configuration permits each room to store raw A/V programs from the cable source (1010) onto the local storage device (1002). This information may then be digitally transmitted over the local area network (1020) to the particular AVSR (1001) that has an attached STB (1013). The raw stored A/V data is then streamed over the local area network (1020) to the remote AVSR (1001) through the attached STB (1013) and then into the AVSR (1001) (in transcoded A/V format) for local storage as A/V program data free from the constraints of STB decoding. This locally stored A/V program data may then be accessed over the local area network (1020) by the remote AVSR for playback on the output presentation device (1003) or transmitted to a remote room for later playback locally.

One aspect of this configuration that should be mentioned is that the use of the STB to provide for the transcoding of the raw A/V program data may be scheduled to occur during periods where the STB is not being used to actively access the cable network for other purposes. For example, raw A/V information may be stored during primetime broadcasts and then transcoded by the STB during the night or day when the STB is typically idle or not used for other purposes. This permits a single STB when used in conjunction with multiple AVSR systems to record a multiplicity of A/V program channels/data without the need to have a physical STB associated with each A/V channel to be recorded.

While the most constrained configuration in this scenario utilizes a single STB (1013) to support this transcoding methodology, the system is not limited to this configuration, as other STBs may be added to individual AVSR systems to provide for additional transcoding capability.

MPEG Conversion of Encoded A/V Content Thru Set-Top Box (STB)

The previous scenario (Background Conversion of Encoded A/V Content Thru Set-Top Box (STB)) may be augmented by incorporating a MPEG encoder to compress the transcoded A/V program data. The result of this data compression can then be distributed via a local area network (1020) to any number of presentation sinks, such as remote output A/V presentation devices, wireless devices, and the like. This data compression can be accomplished by local computer systems (1021) or it can be incorporate within the storage/retrieval data path of the storage device (1002).

General Storage/Retrieval Method (1100)

Figure 10:
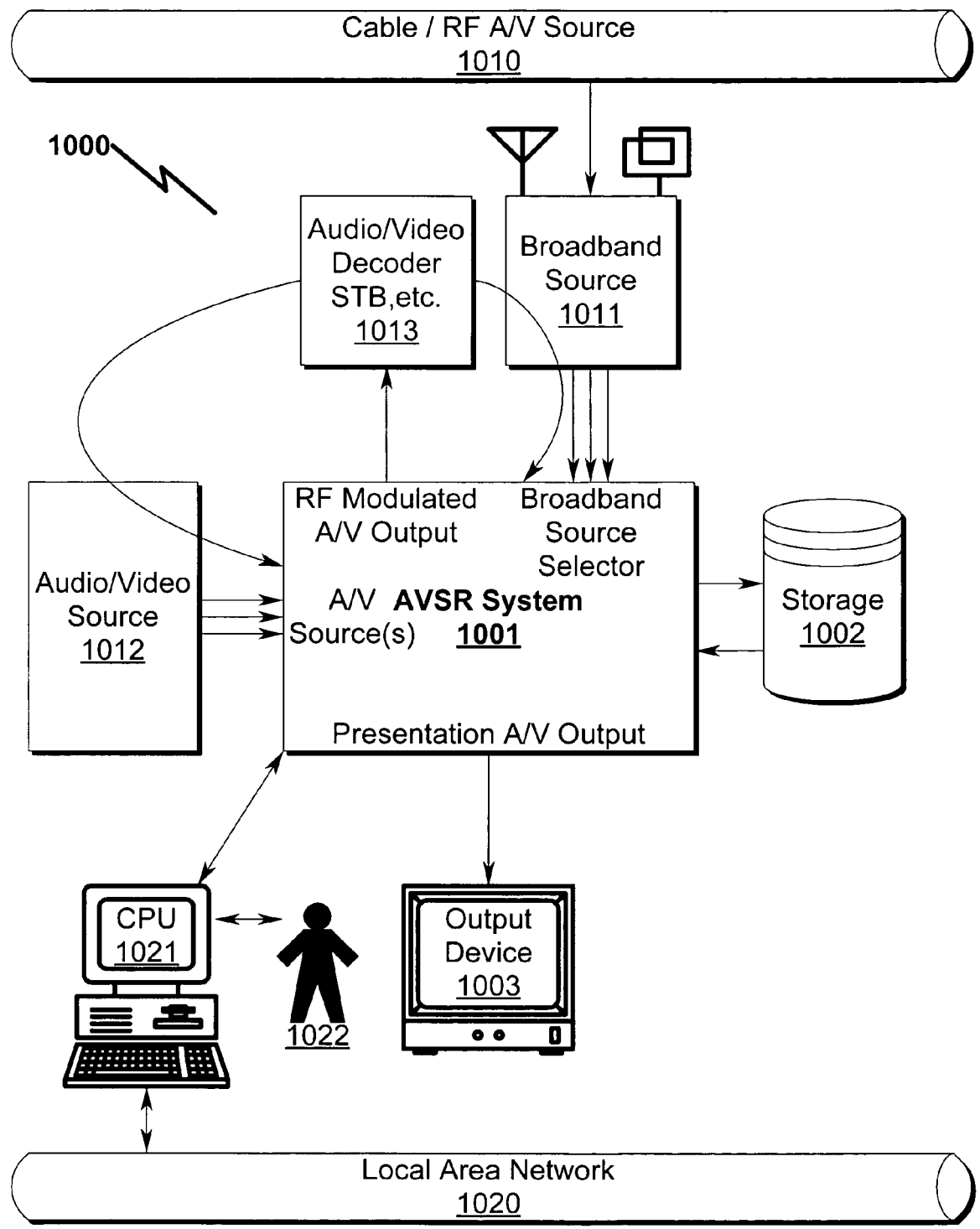
FIG. 10 illustrates an exemplary application context for the present invention as applied to recording broadband A/V sources in an environment that may contain one or more set-top-boxes (STBs)

The mating of the AVSR system and one or more STBs as generally illustrated in FIG. 10 (1000) has an associated method that permits transcoding of video content from the STB for timeshifting of the content to allow later viewing over a variety of display presentation output devices. The present invention STB transcoding method can be generally illustrated by the preferred exemplary embodiment illustrated in FIG. 11 (1100). The general steps of this method comprise the following:

Inputting a broadband source to an AVSR system (1101);
Switching the broadband source to the broadband input of a STB (1102);
Processing the broadband source with the STB to produce a decoded A/V output (1103);

Inputting the decoded STB A/V output into the AVSR system via an AVSR A/V input or AVSR broadband input (1104);

Processing the A/V output of the STB with the AVSR to store a decoded A/V program on a storage device (1105);

Retrieving the decoded A/V program from the storage device and converting the decoded A/V program to an analog signal and modulating the analog signal (1106);

Sending the modulated analog signal to a display output presentation device (1107);

Optionally sending the decoded A/V program from the storage device over a computer network for display on a remote output presentation device attached to a remote AVSR system (1108).

Figure 11:
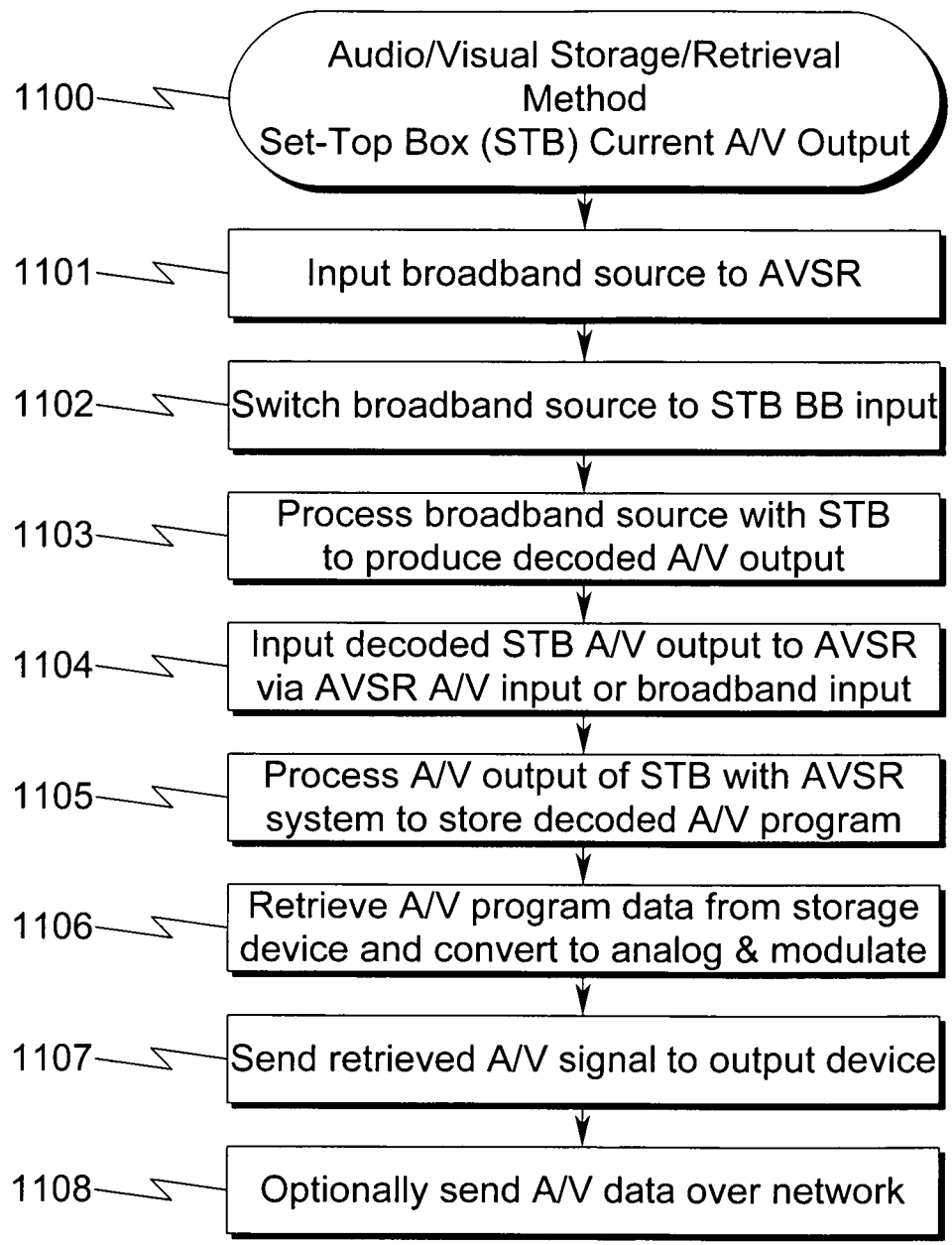
FIG. 11 illustrates an exemplary flowchart for the present invention as applied to recording/transcoding broadband A/V sources in an environment that may contain one or more set-top-boxes (STBs)

This general method as illustrated in FIG. 11 (1100) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Dual-Port Data Access Arrangement (1200)

Figure 12:
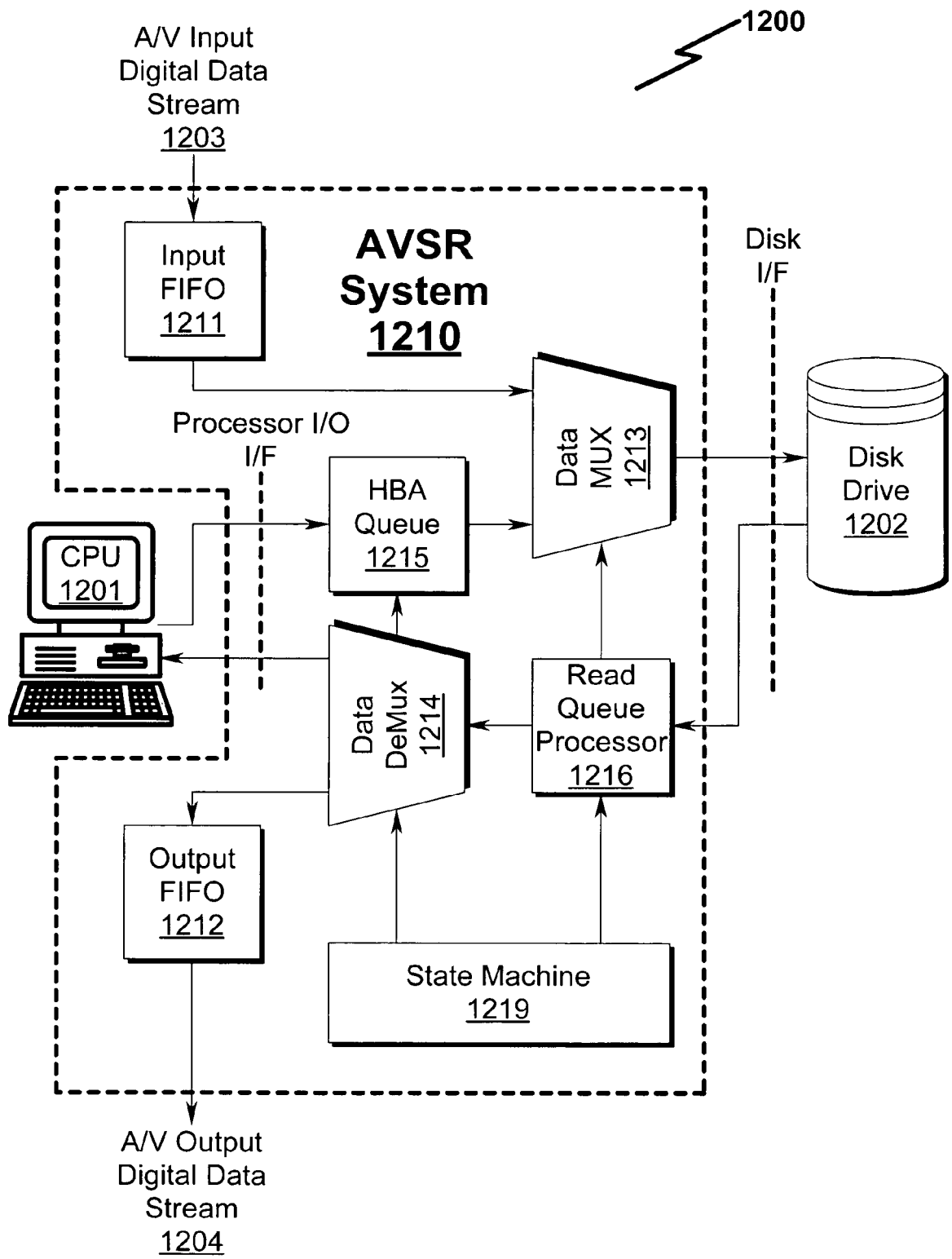
FIG. 12 illustrates an exemplary dual-port data access arrangement useful in some preferred invention embodiments.

While a wide variety of dual-port disk drive mechanisms are known in the art, the system block diagram of FIG. 12 (1200) shows an exemplary system useful in some embodiments of the invention. Here the AVSR system (1210) utilizes FIFOs (1211, 1212) in conjunction with MUX/DEMUX logic (1213, 1214) to interface a computer system (1201) to a storage device (1202). Control for this interface is provided by a state machine that controls HBA queue (1215) and a read queue processor (1216) to coordinate reads and writes to the storage device (1202).

File System Aware A/V LBA Mapping (1300)

Figure 13:
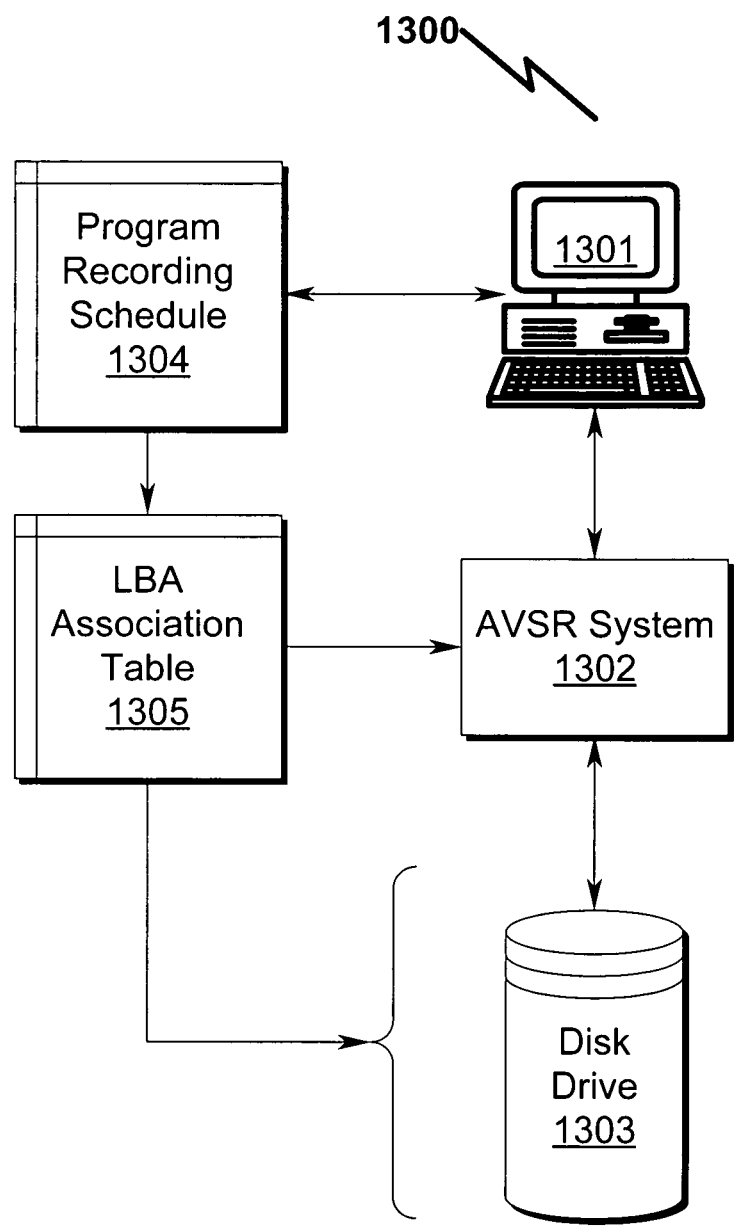
FIG. 13 illustrates file system aware A/V LBA mapping.

The present invention may incorporate file system aware A/V LBA mapping as detailed in FIG. 13 (1300). In this context, the host computer (1301) communicates with an AVSR system (1302) to store/retrieve A/V content on a disk drive storage element (1303). In conjunction with generation of the program recording schedule (1304), the host computer provides to the AVSR system (1302) a table of LBAs associated with the recording/retrieval of data on the disk drive (1303). This LBA association table (1305) permits the AVSR system (1302) to read/write the disk drive (1303) without further intervention from the host computer (1301).

File Locking Absent (1400)

Figure 14:
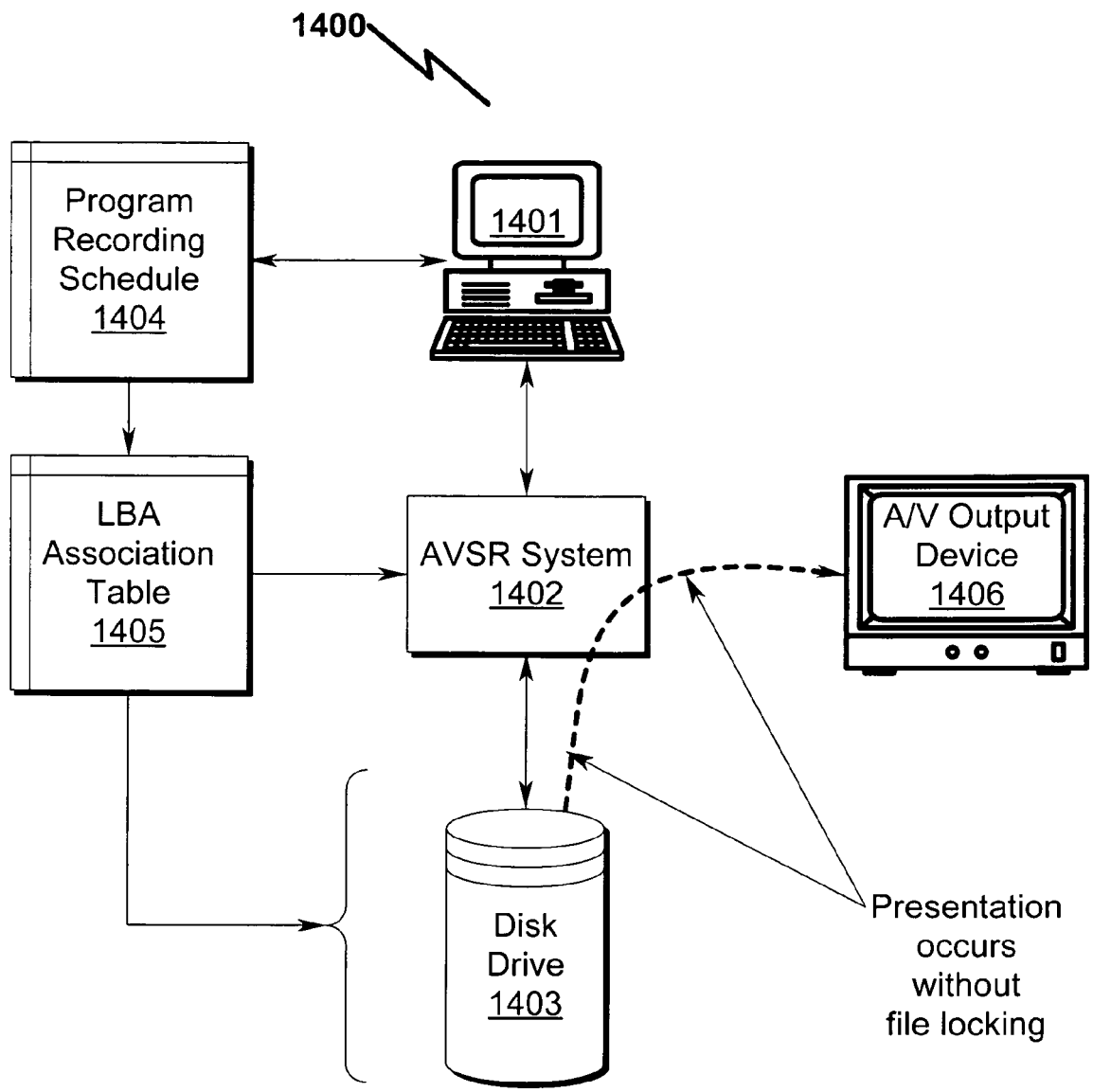
FIG. 14 illustrates the absence of file locking in the presentation of stored A/V media content.

The dual-port nature of the access to the disk drive as generally illustrated in FIG. 14 (1400) with respect to the recovery of recorded media content for presentation on a display presentation output device (1406) means that the present invention overcomes a significant deficiency in the prior art. Generally, prior art DVR/PVR systems utilize an operating system file system interface, requiring that a file "writer" complete all operations and "close" the file before it can be opened by another DVR/PVR system remotely over a network. The present invention makes use of preallocated file sizes that are directly mapped by LBA using the techniques described in FIG. 13 (1300). In this context, the files being recorded are "closed" as far as the operating system is concerned, and may be freely transmitted to remote host computers for display/presentation.

This permits, for example, recording media content in one room and simultaneously transmitting the content via Ethernet or some other network to another host computer in another venue for display presentation. This lack of file interlocking provides a powerful mechanism to deploy media content in real-time, without waiting for the entire show/event to complete before the process is commenced.

Recording Conflict Characterization (1500)

Figure 15:
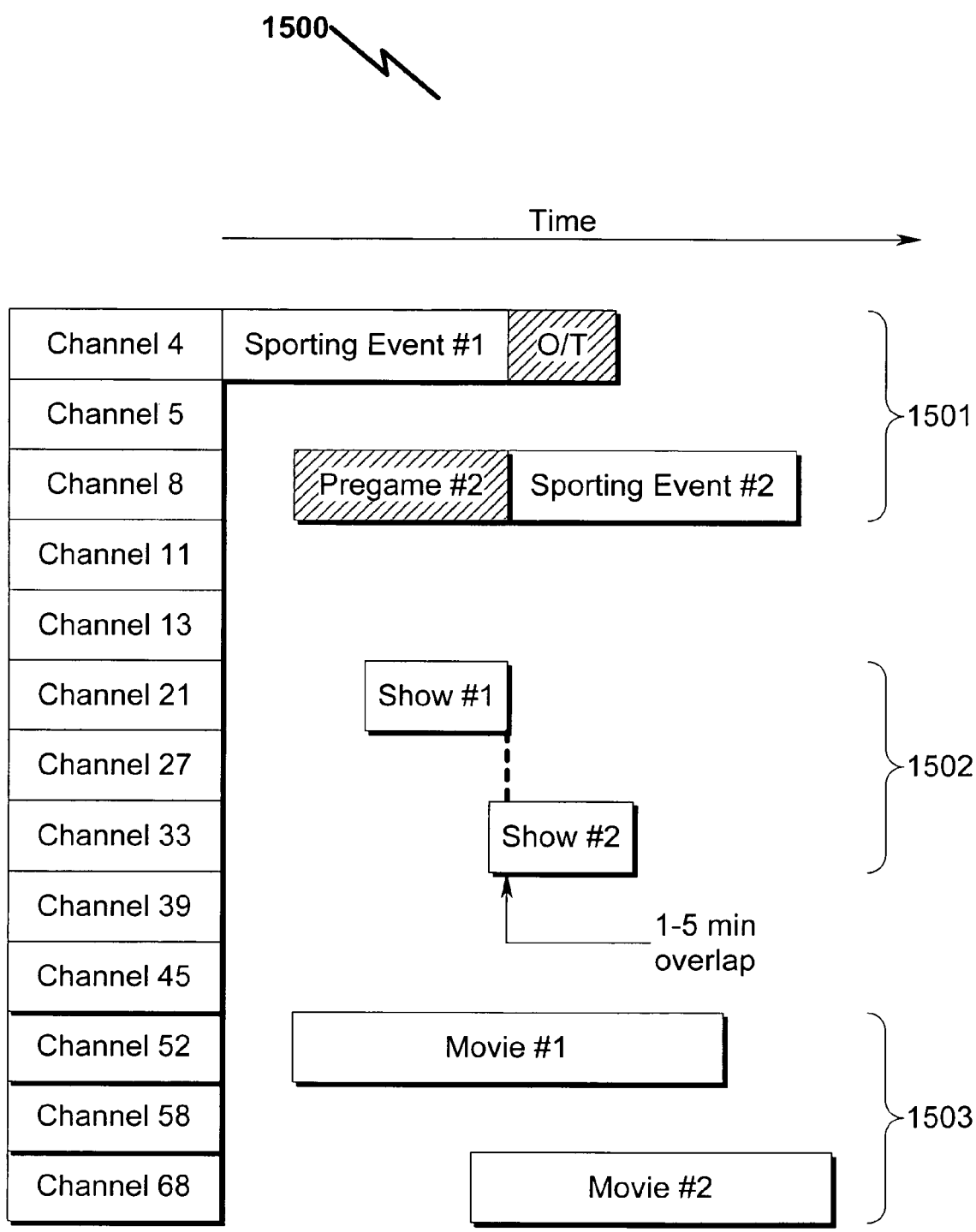
FIG. 15 illustrates recording conflicts in DVR/PVRs.

One of the significant problems in traditional DVR/PVR systems is recording conflicts caused by insufficient recording bandwidth. FIG. 15 (1500) illustrates how this may impact the efficacy of a traditional DVR/PVR system. In this diagram, a sporting event conflict (1501), television program conflict ("time slip") (1502), and movie direct overlap (1503) are illustrated. In the sporting event conflict (1501), overtime in SPORTING EVENT #1 will not be recorded if SPORTING EVENT #2 is recorded. Additionally, note that the PRE-GAME for SPORTING EVENT #2 cannot be recorded. In the "time slip" example (1502), SHOW #2 started 1-5 minutes earlier than expected (or equivalently, SHOW #1 runs 1-5 minutes long) and thus a portion of SHOW #1 and/or SHOW #2 will not be recorded. Minor versions of this problem can occur even if the SHOW is not purposely "time slipped" by the network. Finally, a direct conflict (1503) of MOVIE #1 and MOVIE #2 means that without additional tuners a traditional DVR/PVR system would not be able to record movie #1 and/or movie #2. Note that this complement of six overlapping and conflicted media events cannot be recorded by any single prior art DVR/PVR system, but can be easily supported with the disclosed invention architecture.

Electronic Program Guide (EPG) Integration (1600)

The present invention anticipates that A/V content, especially TV channel programming, may be included in various embodiments of the present invention. As detailed in FIG. 16 (1600), the present invention anticipates a wide variety of methodologies to incorporate electronic program guide (EPG) into the recording logic within the invention implementation. As generally illustrated in FIG. 16 (1600), currently the preferred methodologies of EPG integration include EPG servers, manually scheduled recordings, "scraping" of HTML data from Internet websites, decoding of EPG information, from over-the-air (OTA) broadcasts, and/or "scraping" of video data from cable channel guide broadcasts.

Figure 16:
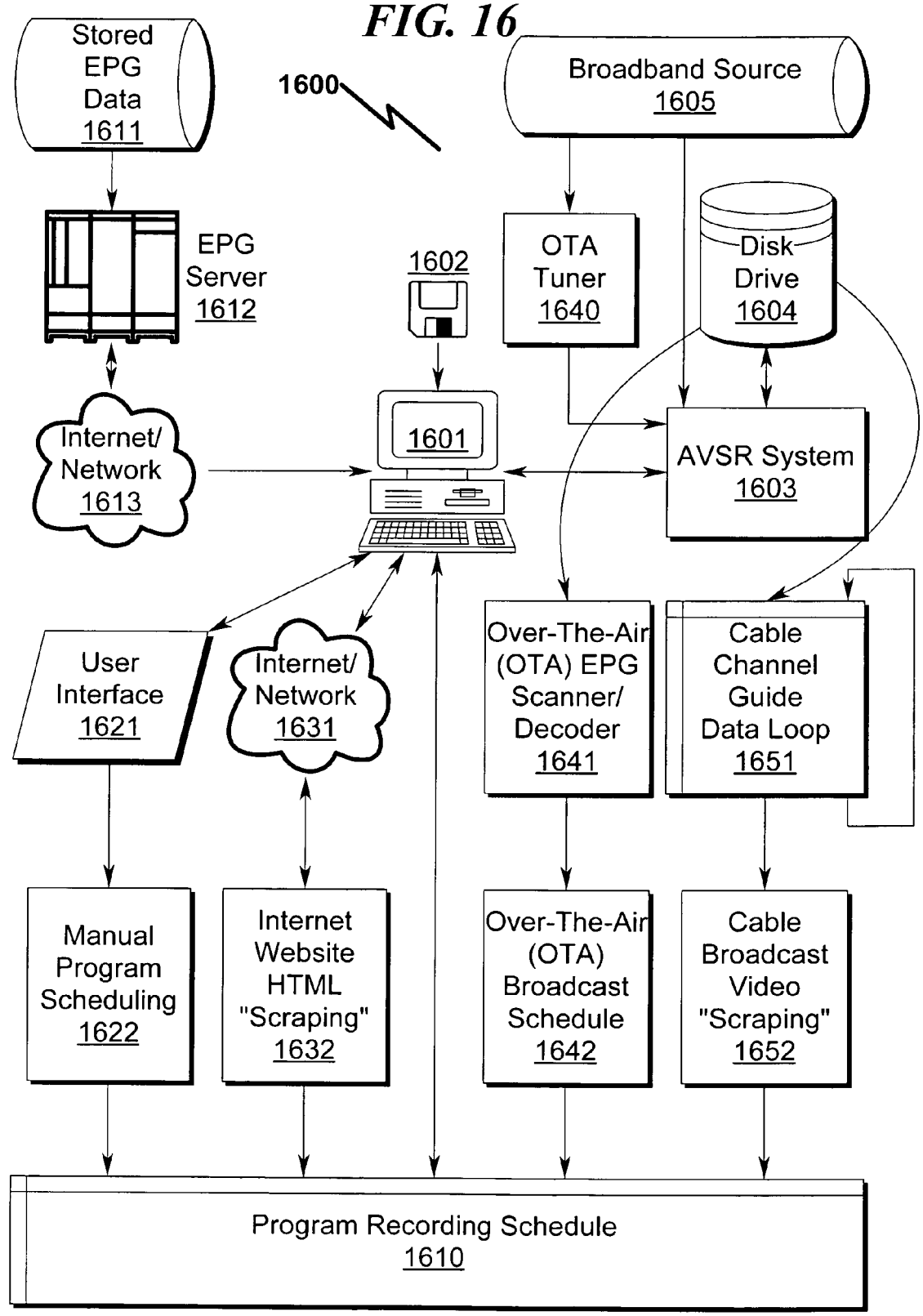
FIG. 16 illustrates exemplary EPG capture methodologies useful in some preferred exemplary embodiments of the present invention.

As depicted in FIG. 16 (1600), the exemplary application context for this discussion of EPG integration includes a host computer system (1601) running application and/or operating software read from a computer readable medium (1602) that interfaces with an AVSR system (1603) having attached disk drive storage (1604). Exemplary A/V input for the system is derived from a broadband source (1605) that is typically a cable TV provider and/or an over-the-air (OTA) broadcaster.

Integration of EPG using EPG servers is accomplished by accessing a stored EPG database (1611) through an EPG server computer (1612) tied to the Internet (1613) or other network. Selection of individual shows for programming is then loaded into the program recording schedule database (1610). Manual program recording is accomplished using a user interface (1621) (typically graphical) that permits the user to set start times and program recording lengths that are then loaded into the program recording schedule database (1610). EPG data may also be obtained via network access (1631) to Internet websites that contain channel programming information that is then "scraped" from the website HTML (1632) to permit an EPG to be extracted from the website data. This information is used to select programs for recording that are entered into the program recording schedule database (1610). EPG data may also be obtained from over-the-air (OTA) broadcasts via a channel scanner/decoder (1641) (often implemented in software) to extract an OTA broadcast schedule (1642) that may be used as a basis for selection of programs that are entered into the program recording schedule database (1610). Finally, many cable channel providers implement a "channel guide" on one or more video channels in their cable network. This channel guide information can be stored in a data loop (1651) and later "scraped" (1652) from the video and used to produce EPG information that is then selected by the user for entry into the program recording schedule database (1610). It should be noted that some OTA tuners (1640) implement display of EPG program data that can also be decoded using the video "scraping" concept. Additionally, video "scraping" is not generally practical with current DVR/PVR systems because of the computational overhead associated with MPEG compression/decompression. In contrast, the uncompressed video stored by the AVSR system is not burdened with this overhead, making it possible to perform the "scraping" operation within the CPU performance limitations of the host computer.

"Look Behind" Recording Methodology (1700)

The present invention in some preferred exemplary embodiments anticipates the use of "look behind" recording methodologies to capture A/V programming and store this programming for later playback. Typical DVR/PVR systems operate using an electronic program guide (EPG), in which A/V programs that are CURRENTLY playing or which will play in the future are listed on the A/V presentation display and selected for recording by the user. This type of EPG service will be termed "look ahead" or "forward EPG" (FEPG). However, what has not been produced, made available, or used within the context of DVR/PVR systems is a "look behind" or "backward EPG" (BEPG) methodology in which the DVR/PVR determines what shows ACTUALLY were broadcast and saves these programs "looking behind" the current time into the past.

The advantages of BEPG are that in many cases the FEPG information is incorrect due to last-minute changes in the A/V programming schedule. Furthermore, both the content and duration of A/V programming may change slightly and the use of FEPG may only capture PART of the complete A/V program. In many circumstances broadcasters are purposely "sliding" their programming schedules by 1-5 minutes to thwart the use of DVR/PVR technologies and "lock in" the viewing audience to their particular network TV channel for the duration of nighttime broadcasts.

Figure 5:
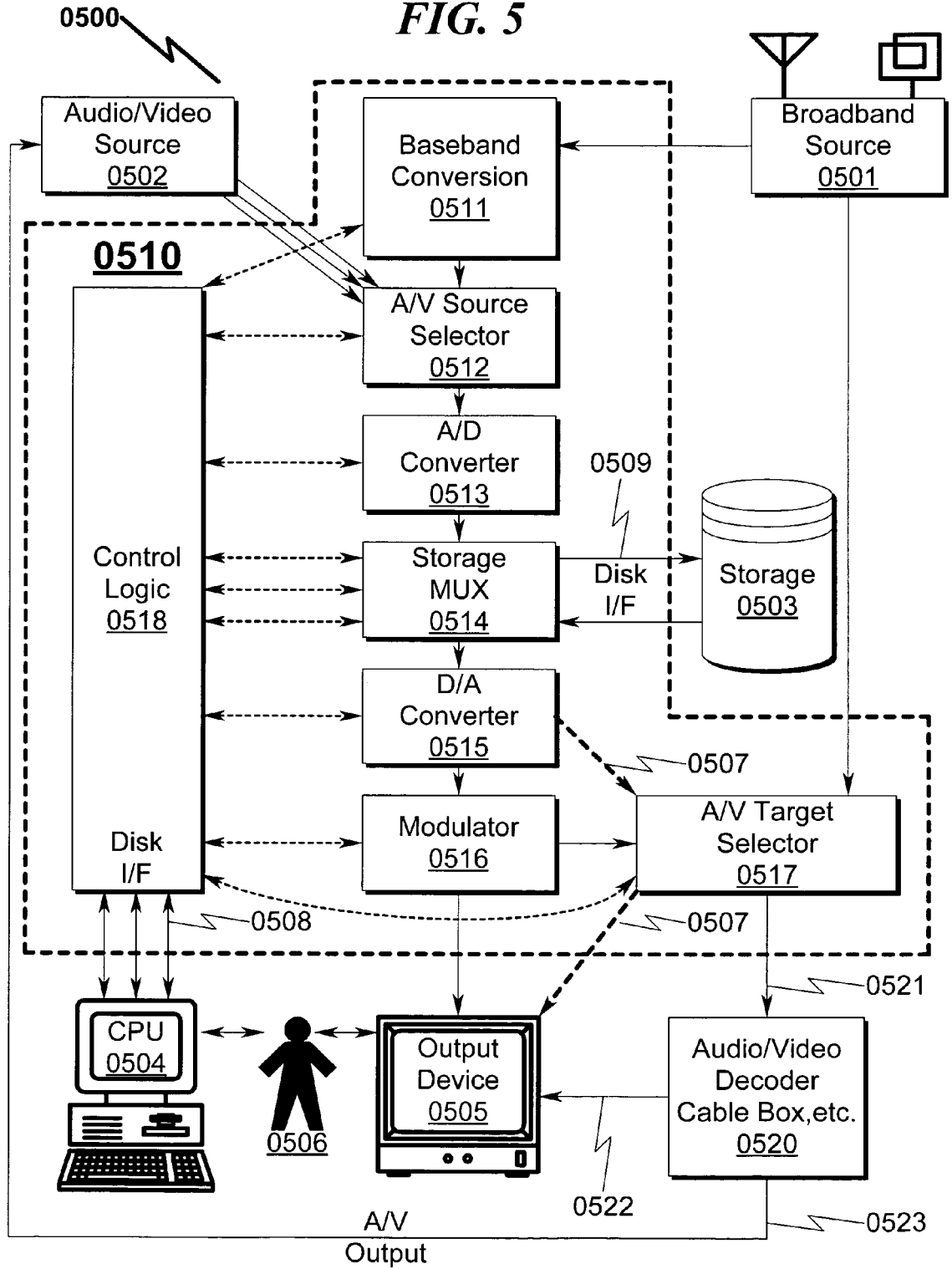
FIG. 5 illustrates a system level application block diagram of a preferred exemplary embodiment of the present invention.
Figure 6:
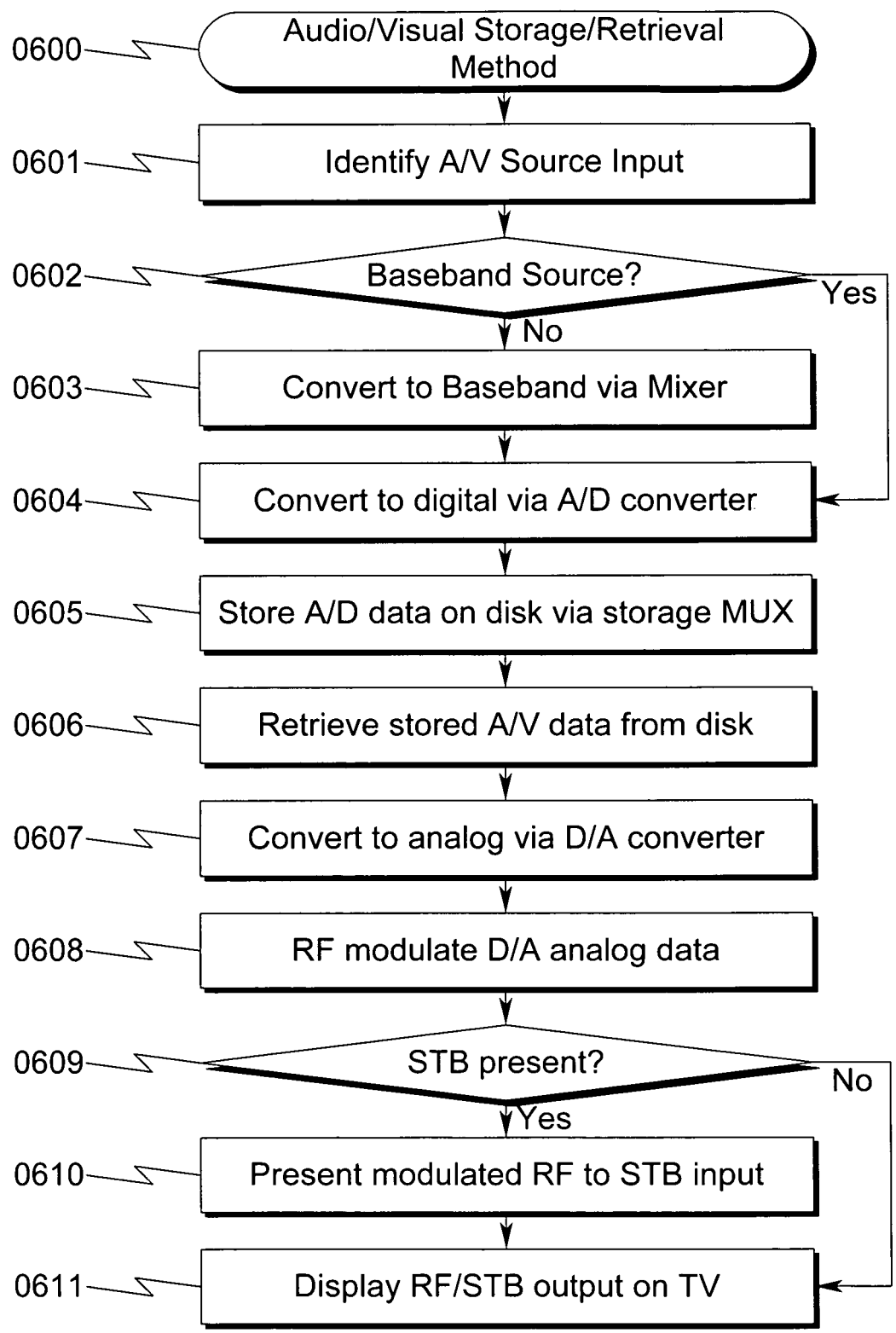
FIG. 6 illustrates an exemplary method level flowchart of a preferred exemplary embodiment of the present invention.
Figure 17:
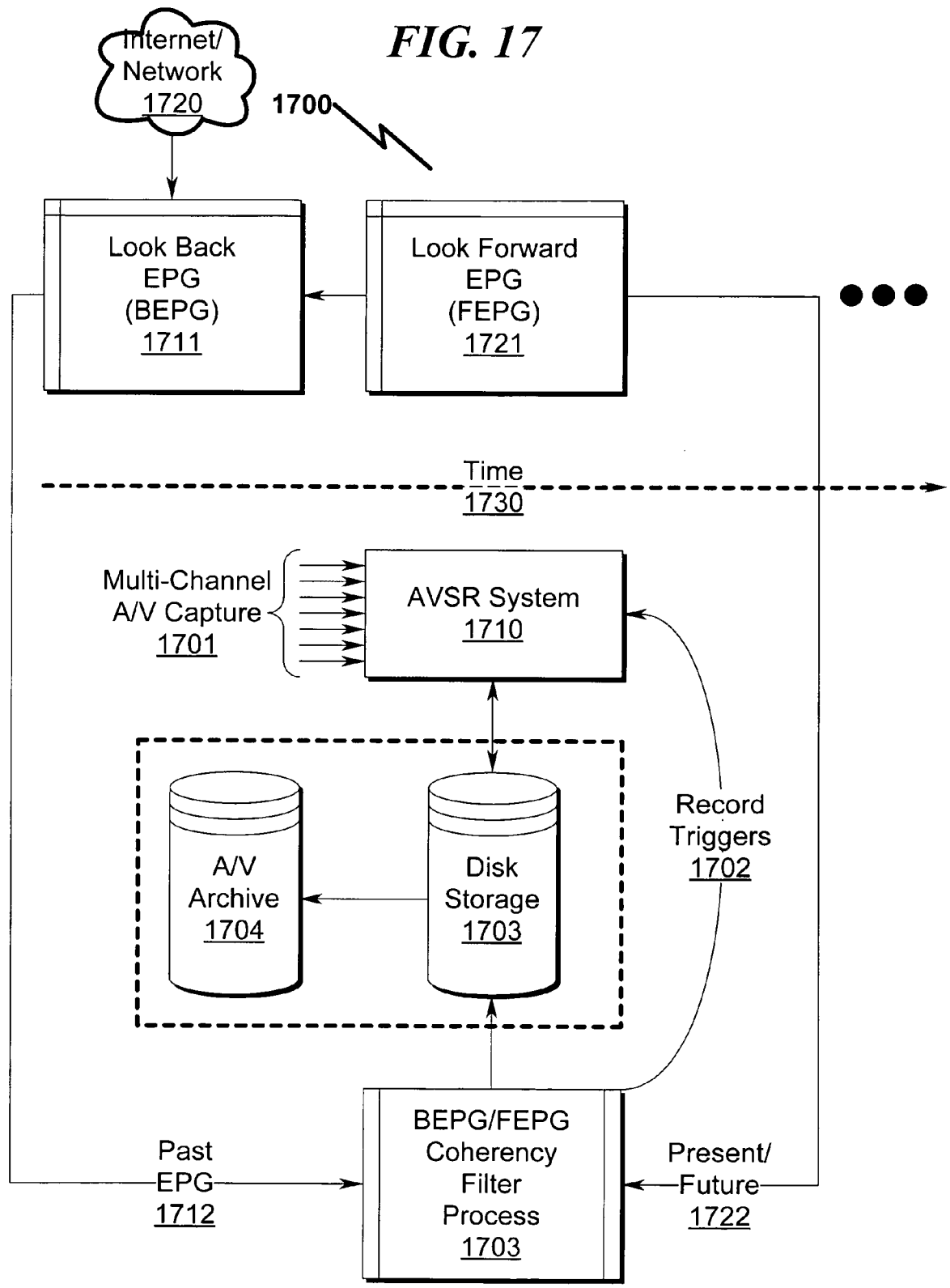
FIG. 17 illustrates the use of lookback EPG in some preferred exemplary embodiments of the present invention.

The present invention anticipates the use of BEPG and/or FEPG to permit A/V programs to be captured in spite of changes by the broadcast networks. A generalized system diagram of this functionality is illustrated in FIG. 17 (1701). In this example it can be seen that the A/V storage/retrieval system (1710) described in FIG. 5 (0500, 0510) is mated with a storage device (1703) to accomplish multi-channel A/V capture (1701) from one or more A/V sources. Recording triggers (1702) are utilized by the system (1710) to initiate recording on one or more selected channels. The optimal implementation of this system is one in which MOST or ALL of the A/V programming channels that a user would watch are simultaneously recorded over a substantial period of time, irrespective of the media content available on these channels. Therefore, in this exemplary embodiment, the storage device (1703) maintains a historical record of ALL the content on a variety of A/V channels selected by the user.

Associated with the A/V programming over a given time period (1710) are data sets corresponding to the look back EPG (BEPG) (1711) and the currently available EPG data (FEPG) (1721). The BEPG (1711) data may also be augmented via the use of a computer network (1720) or other database that keeps historical data on exactly what programming actually occurred on a given A/V channel. Note that this historical data may be different than that of the FEPG information or even the archived BEPG information saved as time (1730) progresses from the FEPG data (1721).

The system anticipates that a BEPG/FEPG coherency filter process (1703) will compare the past EPG data (1712) with the present/future EPG data (1722) to determine if any changes are required to ensure that the A/V content that the user wishes to save is in fact retained in the storage device (1703). Should a given A/V program starting point or content need to be saved that was not anticipated by the FEPG (1721) data, the fact that the AVSR system (1710) has logged past history for the A/V channel in question permits the selected A/V program to be saved to a new file (1704) (or marked for archive within the storage device) even after the A/V program has been broadcast. The BEPG/FEPG coherency filter process (1703) may reside on the same computer system operating as the user interface to the overall A/V presentation system to the user or it may reside on a remote computer system that has access to the storage device (1703).

This "look behind" feature also permits the user to scan the BEPG (1711) to "record" shows that have already been broadcast, and which may not be rebroadcast in the future. A preferred exemplary system context may be useful in examining this capability. For example, it is possible to utilize an embodiment of the present invention to record a number of TV broadcast channels over a period of two weeks or more. This A/V recording scenario would permit a user to look backward using the BEPG (1711) to retrieve ANY program on one of the recorded TV program channels for replay and/or archive. Since the BEPG (1711) is made historically correct with respect to what actually happened in the context of the TV programs, last minute changes to the programming schedule would be incorporated into this information, permitting a greater level of accuracy with respect to capturing programming that was desired by the user.

The present invention anticipates that the BEPG (1711) and/or FEPG (1721) information may be obtained from the broadcast channels themselves or retrieved from other sources (1720), possibly using a computer network. The present invention anticipates that the BEPG (1711) and/or FEPG (1721) data may be "scraped" from broadcast channels associated with cable set-top boxes and the like that typically incorporate a dedicated channel depicting the current and future EPG information associated with all broadcast channels on the given cable network.

Media Timeshifting Content Delivery Model (1800)

A key attribute of the present invention is its ability in some preferred embodiments to capture audio/video information at a rate that is a multiple of the current state of the art. In many preferred embodiments this multiplier is a factor of at least four (4), and can approach ten (10) or more in some preferred embodiments. This presents an opportunity to change the way in which content is delivered to users in the A/V marketplace.

The approach that may be implemented with this new concept is a completely different approach than that taken by traditional DVR/PVR systems. Rather than making the user decide on which individual TV programs he/she wishes to record, the paradigm shifts to requiring the user to select the A/V TV channels that he/she generally has interest. For most TV viewers, there are a set number of TV channels that typically have programming that is of interest, and other channels that are rarely if ever watched. By recording ALL the TV channels of interest simultaneously and saving a historical time record of this content, the present invention permits true "time shifting" of the MEDIA rather than one or two individual TV channels.

Figure 18:
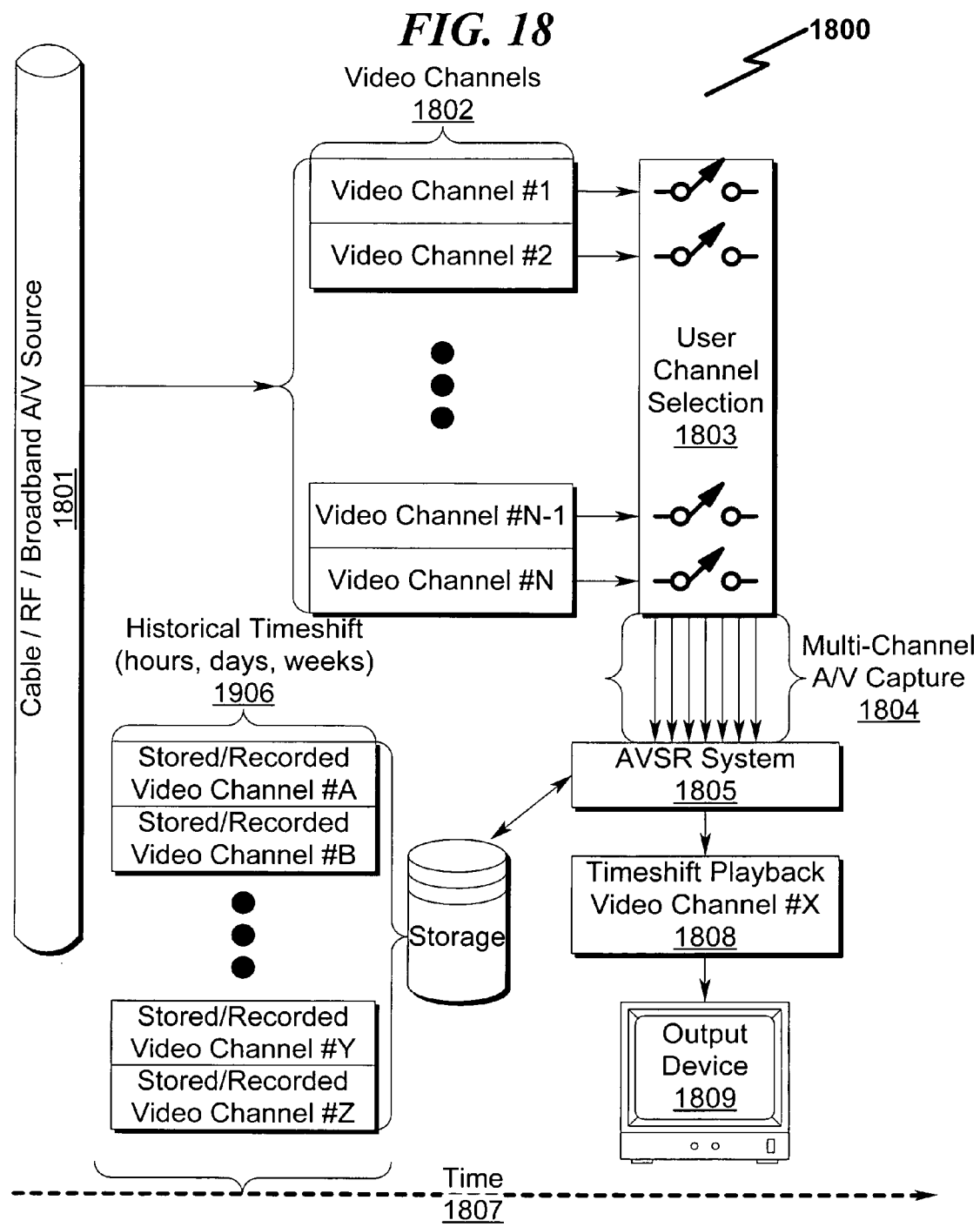
FIG. 18 illustrates the use of a media timeshifting content delivery model as applied to some preferred exemplary embodiments of the present invention.

This concept may be generally illustrated in FIG. 18 (1800), wherein a broadband content source (1801) comprising numerous video channels (1802) undergoes a selection by a user to perform specific channel selection (1803). The selected channels are then the subject of a multi-channel A/V capture (1804) operation by an AVSR system (1805). The AVSR system (1805) records ALL of these selected channels (1803) simultaneously generating a historical timeshift record (1806) that might cover hours, days, weeks, or even months. This historical timeshift (1806), as it may cover a significant historical time period, will by design include the entire range of video content that the user would possibly find useful over an appropriate time interval (1807). This content can then be selected for an individual video channel for timeshift playback (1808) on the AVSR-attached output presentation device (1809).

This model is radically different from the traditional DVR/PVR model in that it appropriately handles a wide variety of situations that are impossible for traditional DVR/PVR systems. For example, if a sporting event is scheduled to run on one TV channel from 12 noon to 3 PM and another sporting event is scheduled to start at 3 PM and end at 6 PM on another TV channel, the traditional DVR/PVR would be programmed to record the first sporting event from 12-3 PM and then the second sporting event from 3-6 PM after appropriately retuning the TV tuner front end to switch TV channels. However, if either of these sporting events "runs over" into overtime or is delayed for any reason, the possibility exists for the DVR/PVR to miss recording the end of the event.

The only practical method to solve this problem with the existing DVR/PVR systems is to use two DVR/PVR systems (or a DVR/PVR system with two tuners) to individually record each sports channel beyond the end of the sporting event. While this solution might work for a single conflict, there are numerous occasions where overlaps in TV content (often by time differentials of less than 10 minutes) ruin the viewing experience of DVR/PVR users because these minor overlaps (or event/programming extensions) cannot be accurately predicted with any form of EPG content. Especially in the case of sporting events, the event length can never be accurately predicted, and it is the occurrence of the extended events that are generally the ones of most interest that are not currently captured by existing DVR/PVR technology.

By permitting dozens of video channels (1802) to be selected by the user (1803) for automatic continuous programming, the present invention truly "time shifts" the entire spectrum of the broadband media (1801) such that the user can backtrack an hour, day, or week as necessary to obtain content that could never have been predictably recorded by a traditional DVR/PVR. In some circumstances, this wholesale recording may be tailored to a given user's preferences. For example, many TV viewers will wish to continuously record all TV channels of interest during primetime viewing hours (5 PM-11 PM), and save this content for each weekday of a given week (MON-FRI), opting to wholesale record specifically all sports channels on the weekend to permit viewing of football or other sporting events as time permits.

On-Request Content Delivery Model (1900)

Figure 19:
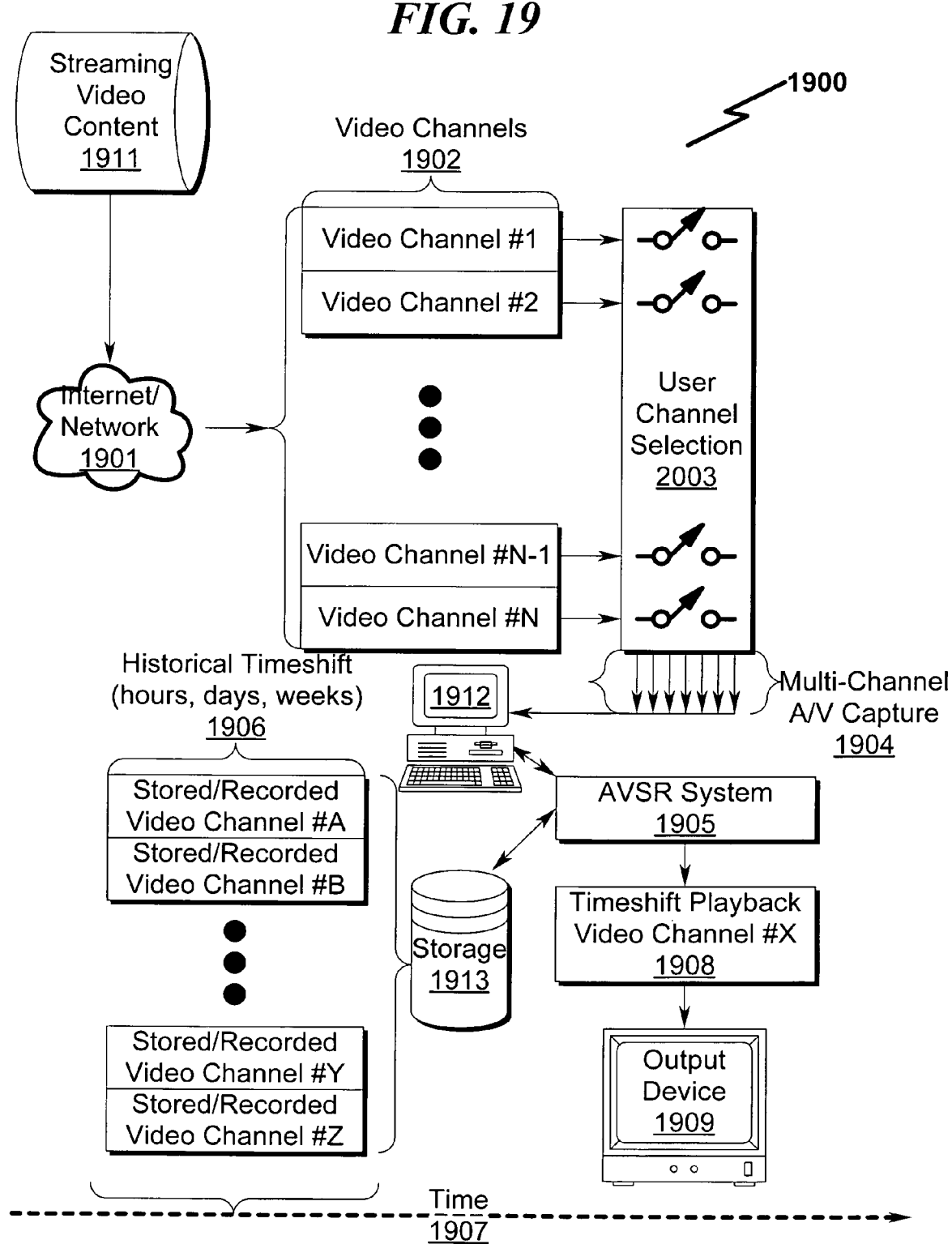
FIG. 19 illustrates the use of an On-Request content delivery model as applied to some preferred exemplary embodiments of the present invention.

The present invention also enables a new content delivery model for network and Internet-based video content suppliers. As generally illustrated in FIG. 19 (1900), this preferred exemplary embodiment of the present invention permits streaming video content (1910) to be delivered over the Internet (1901) that contains a number of video channels (1902) that are selected by a user (1903) (typically via a user interface on the output presentation device (1909) or some other terminal interface). This selected content is then "pulled" from the Internet (1901) from the streaming video content storage (1911) by a computer system (1912) connected to the AVSR system (1905). The AVSR system (1905) interfaces the host computer (1912) with the video storage system (1913) to permit direct storage of the streaming video content on the storage device (1913). This video storage operation can have a historical timeshift (1906) as with other types of TV video discussed previously. The historical timeshift (1906) permits recording of hours, days, weeks, etc. over a lengthy time period (1907) as discussed previously. Playback of the recorded A/V information from the storage device (1913) occurs through the AVSR (1905) by selection of a timeshifted video channel (1908) for display on an output presentation device (1909).

As mentioned previously, this model differs from the conventional DVR/PVR model in that ALL the content of a variety of selected streaming channels can be selected for recording and played back with appropriate timeshifting as desired. Note that the architecture of the AVSR permits simultaneous recording of TV channels off of a broadband source as detailed in FIG. 18 (1800) while the Internet streaming video content (1911) is being recorded in this example. Existing DVR/PVR systems do not have sufficient bandwidth to execute this type of multiple source recording, as they are generally processor limited to typically two or a maximum of four recording channels.

The use of this architecture permits what will be termed herein as "On Request" video recording. The prior art teaches that "On Demand" video presentations can be provided by a video content supplier as the immediate presentation of a video stream selected from a limited suite of video options. The concept presented here is somewhat different in that the video is selected as "requested" but may not necessarily be delivered to the storage device (1913) immediately. Instead, the content delivery may be delayed until Internet traffic is minimized and/or the server providing the streaming video content (1911) is less busy. This permits servicing of streaming video to a wide range of users without the restrictions of having to provide a peak Internet transfer bandwidth during periods of heavy traffic. With this model, the actual transfer of the streaming video can occur when transfer conditions are optimal for the server. Conversely, the system also permits deterministic delivery of streaming video content (1911) at predetermined times set by the user channel selection (1903) interface.

On-Queue Content Delivery Model (2000)

Figure 20:
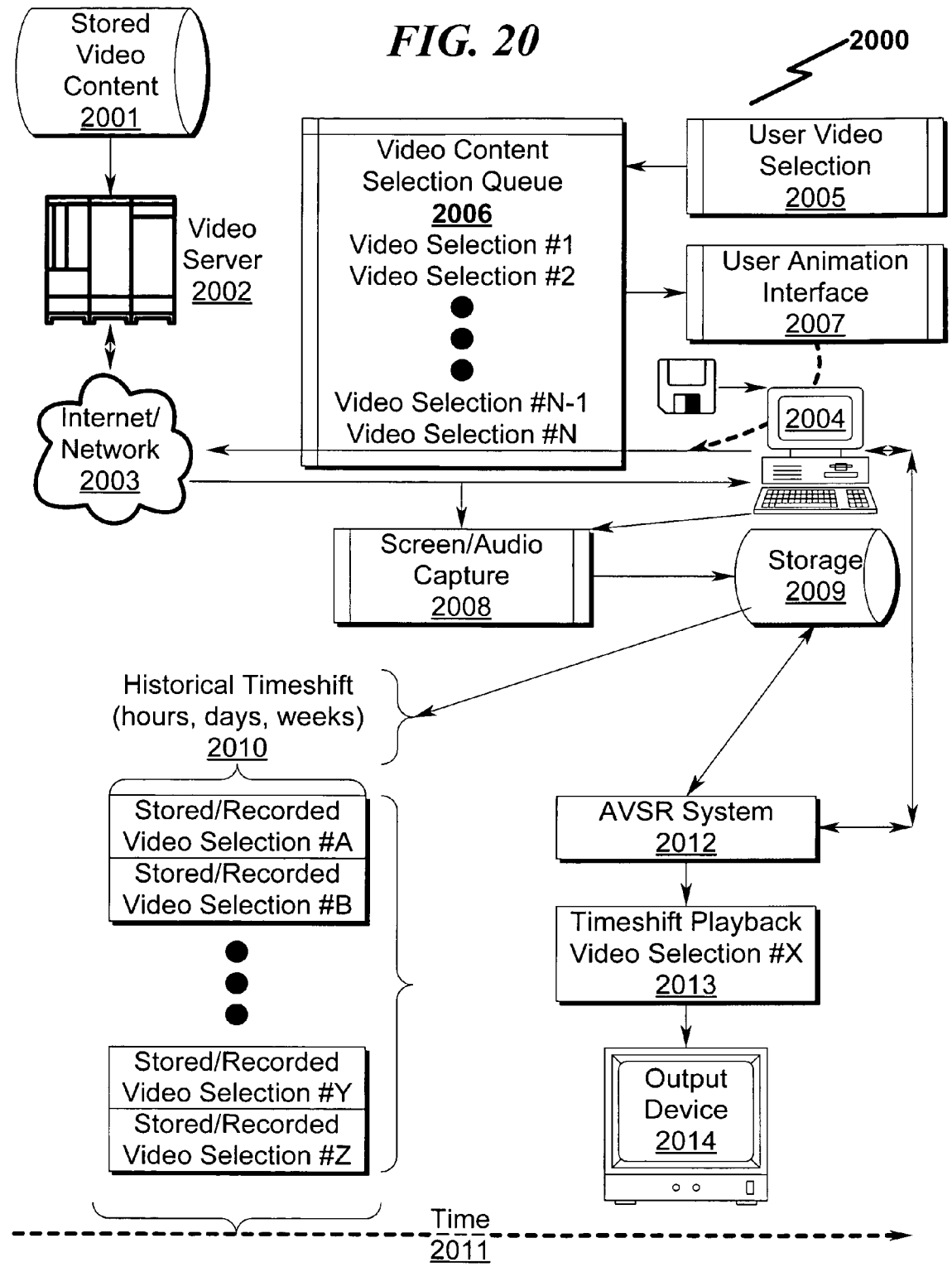
FIG. 20 illustrates the use of an On-Queue content delivery model as applied to some preferred exemplary embodiments of the present invention.

One particularly useful application of the preferred exemplary embodiment of the present invention is generally illustrated in FIG. 20 (2000) and address situations in which a video content user wishes to queue for delivery a number of videos (2006) from a remote content server (2002) for later playback on the output display device (2014). This will be referred herein as an "On-Queue" content delivery model, as it permits a user of video delivery services to timeshift the presentation of this content much in the way that a traditional DVR/PVR would timeshift a conventional TV program.

This invention embodiment works as follows. Stored video content (2001) made available by a video server CPU (2002) is made available via a network (Internet, etc.) (2003) to a host computer (2004). Normally, this stored video content would be individually selected for presentation on the host computer (2004) (typically running under an operating system and/or application software read from a computer readable medium) or some attached output presentation device. This context could in some cases encompass game consoles and the like as well as standalone personal computers or mobile devices. The presentation of this content is generally provided "on-demand" by the video content provider and the associated video server (2002).

The present invention anticipates an embodiment in which this particular architecture is augmented by a user video selection application (2005) running under control of the computer system (2004) to generate a video content selection queue (2006) that Contains a list of video selections to be downloaded from the video server (2002). Since most of the video server (2002) delivery models are geared towards "on demand" presentation of the media content (2001), these systems generally do not support "queuing" of multiple media streams or multiple sequential media content presentations.

However, the video content selection queue (2006) permits a user animation interface (2007) to mimic the user presentation requests necessary to have the video server (2002) deliver the requested content (2006) to the host computer (2004) from the stored video content (2001) via the network (2003). The video (and audio) content received in this fashion is captured with a screen/audio capture application (2008) running under control of the host computer system (2009) that then stores this information on the attached storage device (2009) that is dual-ported via the AVSR system (2012).

The historical timeshift (2010) representing the stored/recorded video selections over the time of presentation (2011) as stored on the data storage device (2009) can be directly accessed by the AVSR system (2012) and timeshift playback (2013) can occur at any later point in time, selecting the particular video content for playback and displaying this to a presentation output device (2014).

Commercial Skipping Capability

The use of historical timeshifting for the wide variety of video content described in FIG. 17 (1700), FIG. 18 (1800), FIG. 19 (1900), FIG. 20 (2000), and elsewhere in this document permits the integration of manual and/or automatic commercial skipping features as a modifier to the video content displayed on the presentation output devices. This capability within the wide context of the video sources presented in the exemplary embodiments presented herein is not possible/feasible with any of the prior art DVR/PVR configurations.

Use of PTDDC Storage Technology (2100)

While the present invention does not limit the type of data storage device(s) that may be utilized within the context of the invention implementation to store audio/video data, several preferred exemplary embodiments of the present invention make use of Pass-Thru Disk Drive Controller (PTDDC) technology storage extension architectures as described in the United States patent application for DATA STORAGE ARCHITECTURE EXTENSION SYSTEM AND METHOD specified above and incorporated herein by reference.

Figure 21:
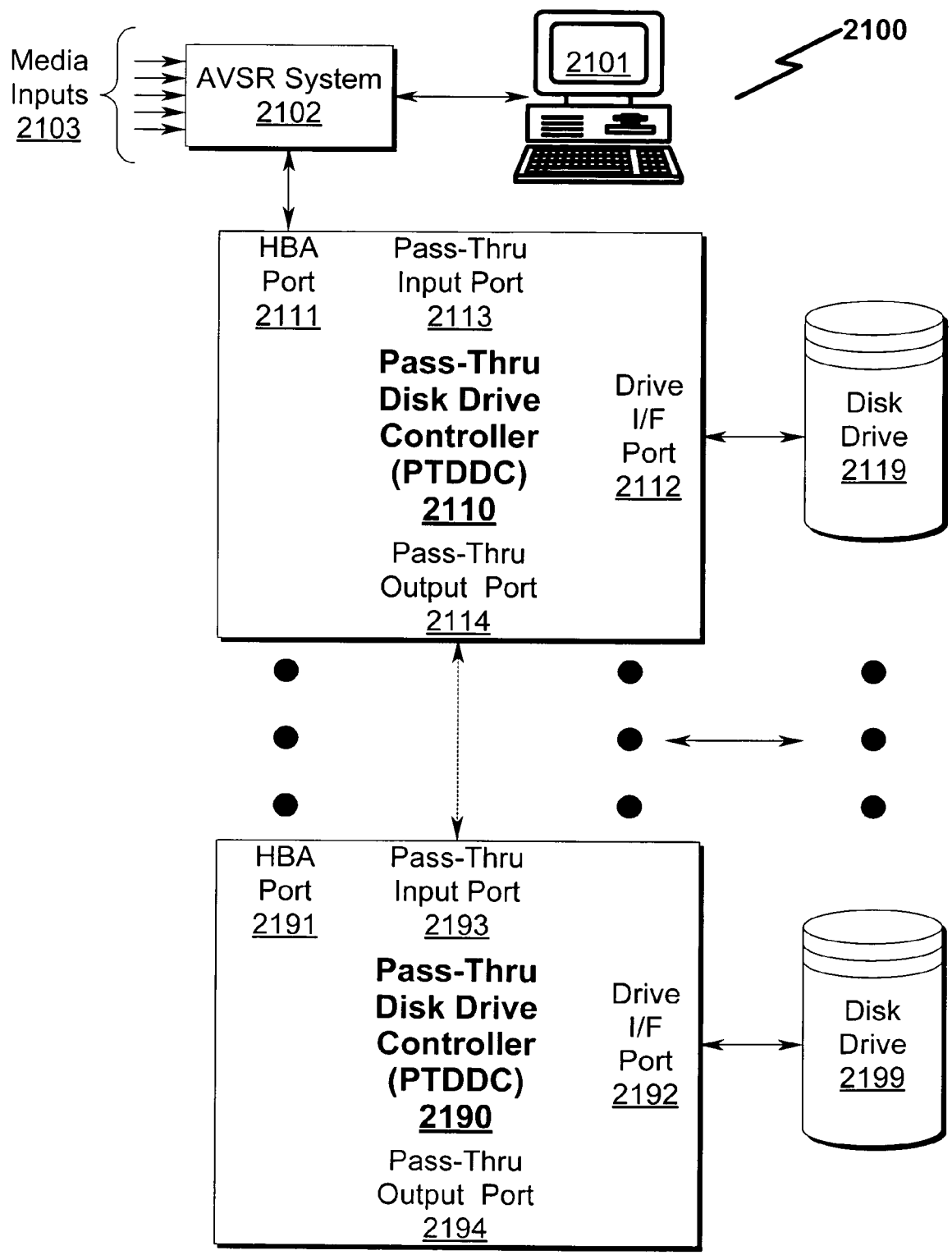
FIG. 21 illustrates the use of pass-thru disk drive controller (PTDDC) technology as applied to some preferred exemplary embodiments of the present invention.

The PTDDC storage architecture permits disk drives to be serially "chained" to indefinite lengths with the resulting logical disk drive as seen by the host computer HBA as one large logical drive having the storage characteristics of all serially connected disk drives in the PTDDC chain. The PTDDC typical system application as applied to a data storage architecture extension system is generally illustrated in FIG. 21 (2100). The system herein generally described is targeted in this exemplary application to adapt a conventional computer-based data storage architecture to incorporate additional extended storage capabilities. The system context as generally illustrated in FIG. 21 (2100) utilizes a computer system (2101) with conventional HBA interface(s) to communicate with a pass-thru-disk drive controller (PTDDC) (2110) (through an AVSR system (2102) as described herein) that is the heart of the architecture extension capability.

The PTDDC (2110) incorporates three or four interface ports. The first port is designated the host bus adapter (HBA) port (2111) and acts as the electrical connection to the HBA interface on the AVSR (2102) via the host computer (2101). The second port is the disk drive I/F port (2112) that acts as an emulated HBA port interface to the disk drive (2119) being serviced. The pass-thru input (PTI) port (2113) and pass-thru output (PTO) port (2114) permit multiple PTDDC entities (2110, 2190) to be daisy-chained together, with each PTDDC controlling one disk drive (2119, 2199) in the storage array. As the PTDDC units (2110, 2190) may be daisy-chained together to any desired level of nesting, there is no explicit limit on the number of disk drives (2119, 2199) that may be serviced by this architecture from a single HBA port (2111) connected to a single computer (2101) HBA interface.

The functionality of the PTDDC (2110, 2190) is as follows. Commands and/or data that originate from the computer (2101) via the HBA interface are presented to the AVSR system (2102) computer bus input and then passed to the HBA port (2111) and interpreted by the PTDDC (2110) to determine if the requested data transfer should be applied to a particular disk drive (2119) attached to the PTDDC (2110). This transfer request generally involves a logical block address (LBA) identifying the starting block to be transferred to/from the disk drive (2119). If the requested LBA is serviced by the attached disk drive (2119), then the request is passed on to the current disk drive attached to the PTDDC (2110). If not, the requested transfer is optionally translated by reducing the LBA request by the size of the attached disk drive (2119) and/or passed on to subsequent PTDDC (2190) units for processing, depending on the particular embodiment of the invention. Once the data transfer is attached to or associated with a particular disk drive (2119, 2199), the data is read from or written to the particular disk drive (2119, 2199) that has been activated by the attached PTDDC (2110, 2190).

While the present invention anticipates that some embodiments may integrate the HBA port (2111) and pass-thru input (PTI) port (2113) functionality into a single interface connection, many preferred embodiments may utilize two separate ports for these connections to enable a simplification of cabling between PTDDC printed circuit board (PCB) connections that support stacked arrays of disk drives (2119, 2199) in a given storage array.

Integration with PTDDC Storage Technology (2200)

Figure 22:
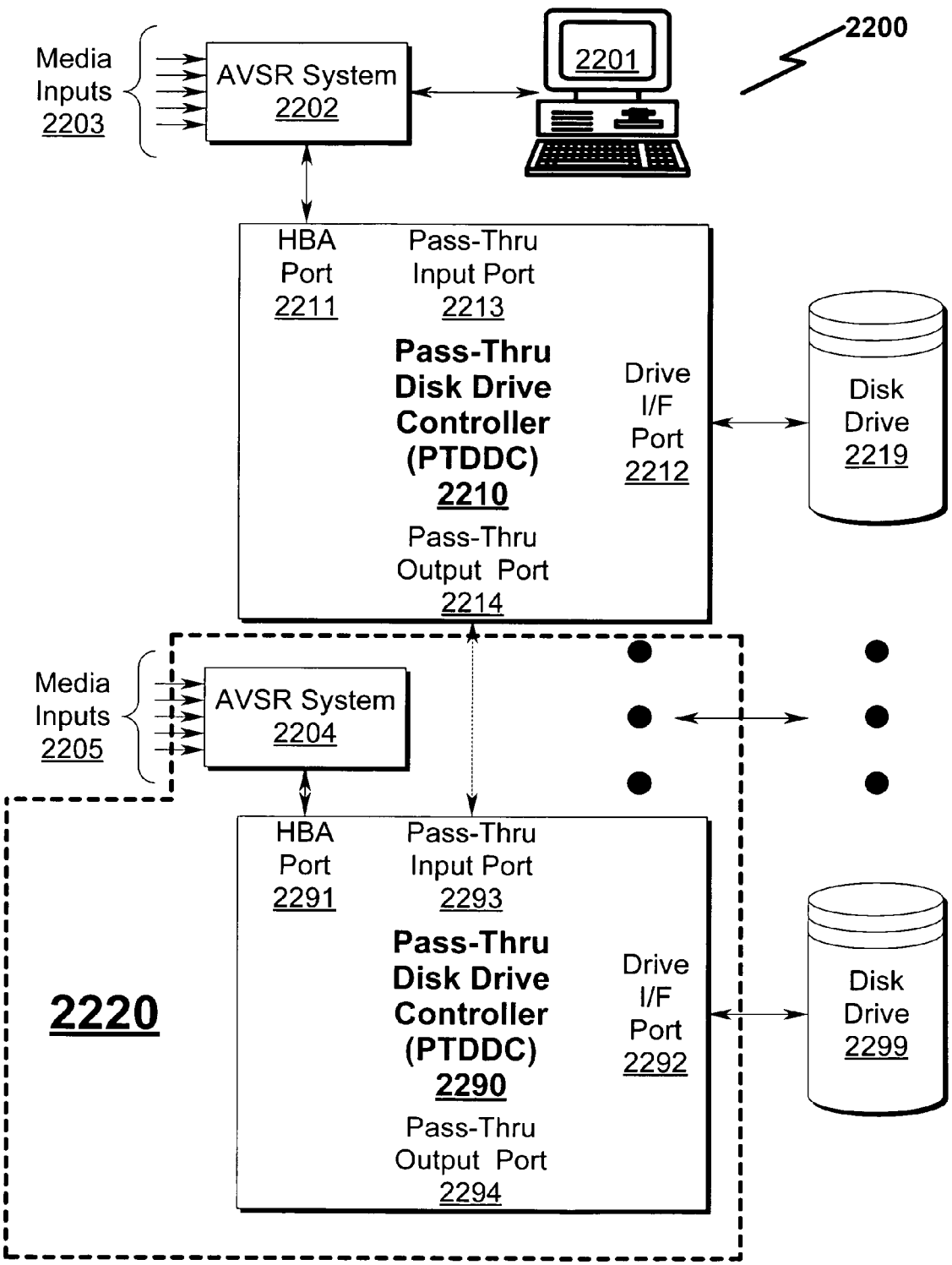
FIG. 22 illustrates the use of pass-thru disk drive controller (PTDDC) technology as applied to some preferred exemplary embodiments of the present invention that incorporate multiple AVSR systems.

The exemplary architecture illustrated in FIG. 21 (2100) assumes that a single AVSR system (2102) communicates with a chained string of PTDDC-attached disk drives (2119, 2199). However, as generally illustrated in FIG. 22 (2200) the integration of AVSR systems (2202, 2204) is more generalized than depicted in FIG. 21 (2100). In FIG. 22 (2200) we see that each PTDDC (2210, 2290) can have associated with it an AVSR system (2202, 2204), each of these AVSR systems having multiple A/V media inputs, multiple internal tuners, etc. Thus, if a given AVSR system is configured to support recording of 16 video channels, the system depicted in FIG. 22 (2200) will be capable of simultaneously recording 32 A/V channels. Since each AVSR system (2202, 2204) is directly communicating with the local disk drive (2219, 2299), there is little if any bandwidth limitation on the system when configured in this recording architecture.

A significant benefit of this architecture is that it presents a single HBA interface to the host computer (2201), thus permitting a single computer system (with limited computational ability and internal bus bandwidth) to accomplish recording a plethora of A/V channels that would be impossible using architectures currently employed by the prior art. In this example, a recording configuration with two 16-channel AVSR systems (2202, 2204) would be responsible for simultaneous recording of 192 MB/sec, far more than would be possible by the fastest available computer system typically available for use in this application.

It should be noted in this application that the AVSR systems (2202, 2204) may be integrated into the electronics of the PTDDC components (2210, 2290) as depicted in inset (2220). This integration can take the form of a backplane to which the disk drives (2219, 2299) mount, or more aggressively, within the on-disk PCB controlling the individual disk drive systems (2219, 2299).

Furthermore, the PTDDC concept, while differentiating the HBA (2211, 2291) and PTI (2213, 2293) ports, makes no distinction between these with respect to data access to the disk drives (2219, 2299). As such, the placement of the AVSR system (2202, 2204) interface need not be limited to the HBA ports (2211, 2291), but could equivalently be connected to the PTI ports (2213, 2293). The generalized PTDDC concept does not require that these ports have the same electrical interface, thus this generalization is possible.

Finally, note that the PTI port (2213) of the initial PTDDC (2210) in the chain could be optionally connected to the host computer (2201) directly or in some configurations connected to another computer system, thus permitting dual access to the stored media content on the disk drives (2219, 2299) via the PTDDC (2210, 2290) interfaces. This host selection dual port interface is an implicit benefit of the PTDDC storage extension architecture.

Advantages of AVSR Integration with PTDDC

While the present invention makes no limitation as to the type of storage device that may be used for the recording media associated with A/V data capture, many preferred embodiments utilize the PTDDC storage extension architecture for the following reasons:
  PTDDC-chained disk drives permit inexpensive storage to be added to the AVSR system to permit "wide channel" recording, where a plethora of video channels can be simultaneously recorded without the worry of running out of storage capacity.
  PTDDC storage systems may be incrementally increased in size without the need for reengineering the storage architecture or replacing hardware.
  PTDDC storage systems present a consistent HBA interface to the host computer, minimizing utilization of scarce HBA resources in the host computer.
  PTDDC storage systems, due to their extremely low cost, permit much larger and inexpensive storage capacities for a DVR/PVR implementation of the AVSR system. Since the "event horizon" for a timeshifted historical video record is directly dependent on the video storage capacity, the PTDDC storage systems solve a big problem in the DVR/PVR marketplace—that of limited available storage.
  PTDDC storage systems, since they present the chained disk drives to the host computer (and AVSR system) as one large logical drive, tend not to waste space in situations where video storage crosses disk drive boundaries. Traditional DVR/PVR systems are generally not capable of "spanning" multiple disk drive volumes, and are typically limited to one or two hard drive storage elements.

One skilled in the art will recognize that this list may not be exhaustive given the particular context of embodiment implementation for the present invention System Summary—Baseband Output (2300)

Figure 23:
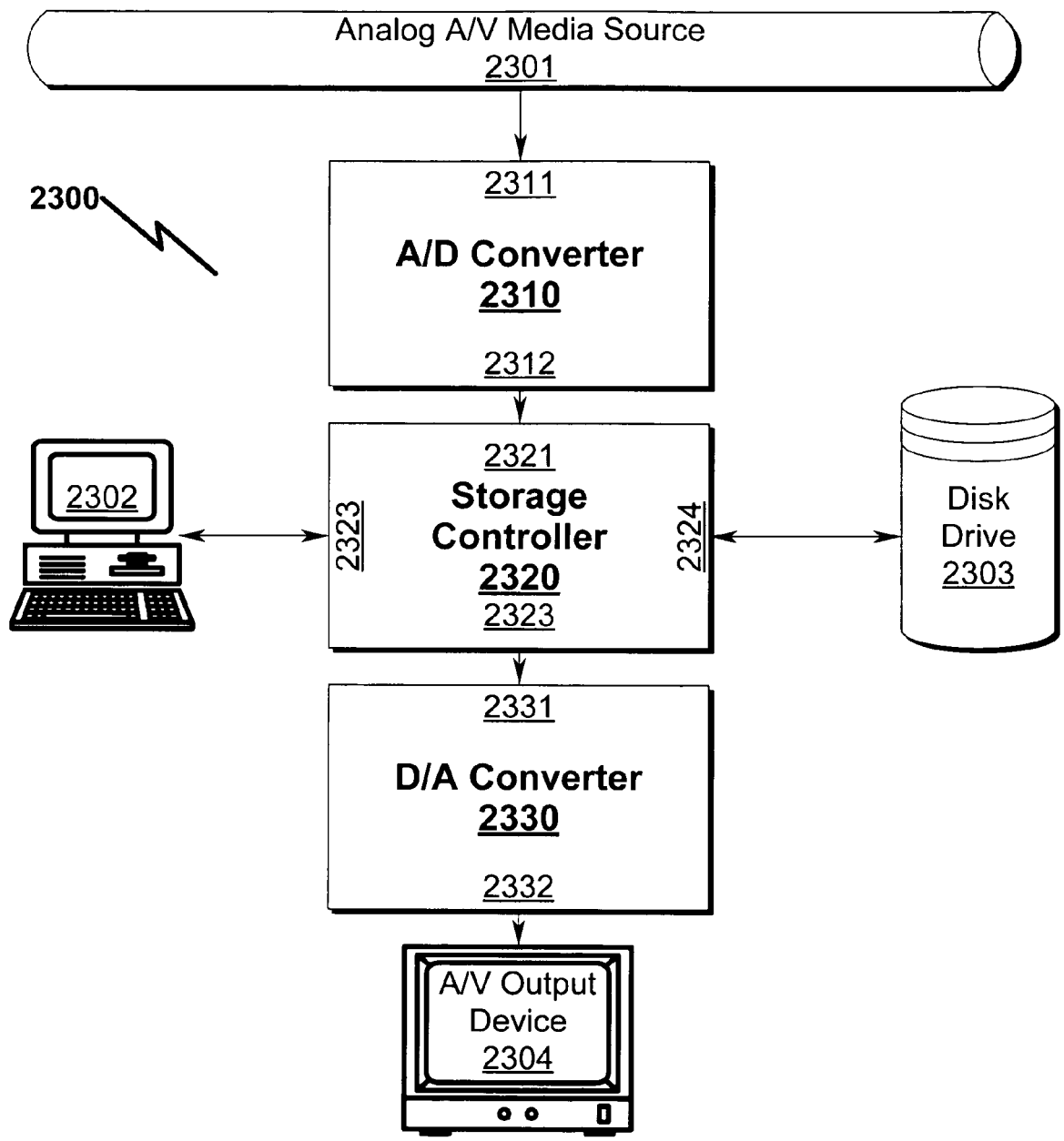
FIG. 23 illustrates a preferred exemplary baseband embodiment of the present invention system.

The present invention system anticipates a wide variety of variations in the basic theme of construction, but one broadly described preferred exemplary baseband output embodiment can be generalized as illustrated in FIG. 23 (2300) as an audio/video storage/retrieval system comprising:
  (a) A/D converter (2310) comprising an A/D analog input port (2311) and an A/D digital output port (2312);
  (b) storage controller (2320) comprising a media input port (2321), media output port (2322), processor I/O port (2323), and storage I/O port (2324); and
  (c) D/A converter (2330) comprising a D/A digital input port (2331) and a D/A analog output port (2332);
wherein
  the A/D converter (2310) receives analog A/V media signaling (2301) as input to the A/D analog input port (2311) and converts the analog A/V media signaling (2301) to a A/V digital media stream emitted at the A/D digital output port (2312);
  the A/V digital media stream is electrically transmitted to the media input port (2321) of the storage controller (2320);
  the storage controller (2320) transmits the A/V digital media stream to a storage device (2303) connected to the storage I/O port (2324), wherein the storage device (2303) creates an A/V stored media stream within the storage device (2303);
  the storage controller (2320) retrieves the A/V stored media stream from the storage device (2303) via the storage I/O port (2324) and transmits the A/V stored media stream to the media output port (2322) as an A/V retrieved media stream;
  the A/V retrieved media stream is electrically transmitted to the D/A digital input port (2331);
  the D/A converter (2330) receives the A/V retrieved media stream as input to the D/A digital input port (2331) and converts the A/V retrieved media stream to an A/V reconstructed analog media stream at the D/A analog output port (2332);
  the A/V reconstructed analog media stream is electrically emitted at the D/A analog output port (2332) for presentation using an A/V output device (2304) connected to the D/A analog output port (2332);

the storage controller (2320) communicates with a CPU (2302) via the processor I/O port (2323) to determine the placement of the A/V digital media stream on the storage device (2303);

the storage controller (2320) communicates with a CPU (2302) via the processor I/O port (2323) to control the retrieval of the A/V stored media stream from the storage device (2303) and the transfer of the A/V stored media stream to the D/A converter (2330) for presentation on the A/V output device (2304);

the storage controller (2320) processor I/O port (2323) permits the CPU (2302) to simultaneously access the A/V stored media stream while the storage controller (2320) receives the A/V stored media stream; and the storage controller (2320) processor I/O port (2323) permits the CPU (2302) to simultaneously access the A/V stored media stream while the storage controller retrieves the A/V retrieved media stream.

This general system summary may be augmented by the various elements described herein to produce a wide variety of invention embodiments consistent with this overall design description. The above generalized system elements may incorporate a wide variety of embodiments. Additionally, some elements may be omitted in some preferred embodiments depending on system requirements and overall system construction.

System Summary—Broadband Output (2400)

Figure 24:
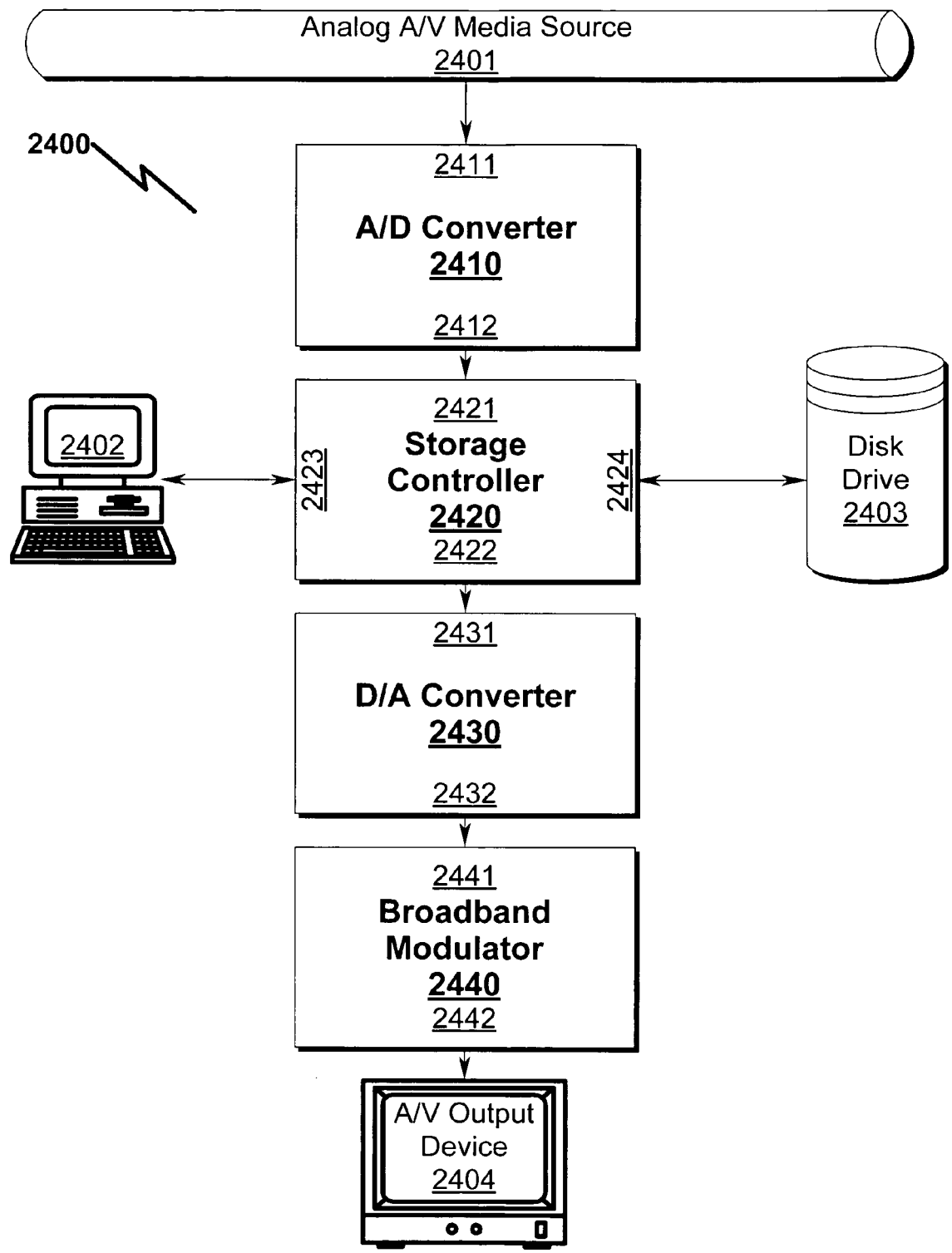
FIG. 24 illustrates a preferred exemplary broadband embodiment of the present invention system.

The present invention system anticipates a wide variety of variations in the basic theme of construction, but one broadly described preferred exemplary broadband output embodiment can be generalized as illustrated in FIG. 24 (2400) as an audio/video storage/retrieval system comprising:

(a) A/D converter (2410) comprising an A/D analog input port (2411) and an A/D digital output port (2412);

(b) storage controller (2420) comprising a media input port (2421), media output port (2422), processor I/O port (2423), and storage I/O port (2424);

(c) D/A converter (2430) comprising a D/A digital input port (2431) and a D/A analog output port (2432); and (d) Broadband modulator (2440) comprising and A/V baseband input port (2441) and a A/V modulated output port (2442);

wherein the A/D converter (2410) receives analog A/V media signaling (2401) as input to the A/D analog input port (2411) and converts the analog A/V media signaling (2401) to a A/V digital media stream emitted at the A/D digital output port (2412);

the A/V digital media stream is electrically transmitted to the media input port (2421) of the storage controller (2420);

the storage controller (2420) transmits the A/V digital media stream to a storage device (2403) connected to the storage I/O port (2424), wherein the storage device (2403) creates an A/V stored media stream within the storage device (2403);

the storage controller (2420) retrieves the A/V stored media stream from the storage device (2403) via the storage I/O port (2424) and transmits the A/V stored media stream to the media output port (2422) as an A/V retrieved media stream;

the A/V retrieved media stream is electrically transmitted to the D/A digital input port (2431);

the D/A converter (2430) receives the A/V retrieved media stream as input to the D/A digital input port (2431) and converts the A/V retrieved media stream to an A/V reconstructed analog media stream at the D/A analog output port (2432);

the A/V reconstructed analog media stream is received by the broadband modulator (2440) at the A/V baseband input port (2441) and converted via broadband modulation to produce an A/V broadband output signal electrically emitted at the A/V modulated output port (2442) for presentation using an A/V output device (2404) connected to the A/V modulated output port (2442);

the storage controller (2420) communicates with a CPU (2402) via the processor I/O port (2423) to determine the placement of the A/V digital media stream on the storage device (2403);

the storage controller (2420) communicates with a CPU (2402) via the processor I/O port (2423) to control the retrieval of the A/V stored media stream from the storage device (2403) and the transfer of the A/V stored media stream to the D/A converter (2430) for presentation on the A/V output device (2404);

the storage controller (2420) processor I/O port (2423) permits the CPU (2402) to simultaneously access the A/V stored media stream while the storage controller (2420) receives the A/V stored media stream; and the storage controller (2420) processor I/O port (2423) permits the CPU (2402) to simultaneously access the A/V stored media stream while the storage controller retrieves the A/V retrieved media stream.

This general system summary may be augmented by the various elements described herein to produce a wide variety of invention embodiments consistent with this overall design description. The above generalized system elements may incorporate a wide variety of embodiments. Additionally, some elements may be omitted in some preferred embodiments depending on system requirements and overall system construction.

Method Summary

The present invention method anticipates a wide variety of variations in the basic theme of implementation, but can be generalized as an audio/video storage/retrieval method wherein the method comprises:

(1) identifying an A/V source input;
(2) determining if said A/V source is baseband, and if so, proceeding to step (4);
(3) converting said A/V source input to a baseband A/V signal via a mixer;
(4) converting said baseband A/V signal to a digital representation using an A/D converter;
(5) storing said digitized representation on a storage device using a dual port storage multiplexer;
(6) retrieving said digital representation from said storage device using said dual port storage multiplexer;
(7) converting the digital representation to a restored analog signal using a D/A converter;
(8) RF modulating said restored analog signal to generate a restored broadband signal;
(9) if a set-top-box (STB) is not present, proceeding to step (11);
(10) presenting the restored broadband signal to said STB;
(11) displaying the restored broadband signal or output from said STB on an A/V presentation device.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and its associated method may be augmented with a variety of ancillary embodiments, including but not limited to:

An embodiment wherein the storage device is a serial chain of PTDDC-attached disk drives.

An embodiment wherein the storage I/O port is a SATA disk drive interface.

An embodiment wherein the A/D converter contains a multiplexer to permit sequential simultaneous capture of multiple analog A/V media signaling inputs.

An embodiment wherein the A/D converter, the storage controller, and the D/A converter are integrated within a PTDDC such that the processor I/O port functions as the HBA interface port to the PTDDC.

An embodiment wherein the A/D converter receives analog A/V media signaling from a broadband-to-baseband converter, the broadband-to-baseband converter deriving its broadband input from a broadband A/V media source.

An embodiment wherein the A/D converter receives analog A/V media signaling from a cable network set-top box (STB) converter, the cable network set-top box (STB) converter deriving its broadband input from a broadband A/V media source.

An embodiment wherein said broadband A/V media source is obtained from a cable network set-top box (STB).

One skilled in the art will recognize that other embodiments are possible based on combinations of elements taught within the above invention description.

CONCLUSION

An audio/video storage/retrieval system and method that permits efficient and cost-effective simultaneous recording of multi-channel A/V information from a variety of sources has been disclosed. The system/method may be broadly described as generally incorporating baseband conversion of source RF modulated A/V information followed by analog-to-digital conversion and storage on a storage device utilizing a dual port interface that incorporates an additional computer access port to permit transparent storage access by a computer system. Retrieval of stored A/V programming from the storage device via the dual port interface permits the stored A/V data to be converted to analog and RF modulated for presentation to an A/V presentation device. Additional A/V source and/or target selectors may be incorporated into the system/method to permit recording a plethora of A/V sources such as raw A/V signaling, OTA broadcasts, clear/encrypted cable QAM broadcasts, cable set top boxes (STBs), and the like.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. An audio/video storage/retrieval system comprising:
(a) A/D converter comprising an A/D analog input port and an A/D digital output port;
(b) storage controller comprising a media input port, media output port, processor I/O port, and storage I/O port; and
(c) D/A converter comprising a D/A digital input port and a D/A analog output port;
wherein
said A/D converter receives analog A/V media signaling as input to said A/D analog input port and converts said analog A/V media signaling to a A/V digital media stream that has not been pre-processed by MPEG data compression;
said A/D converter emits said A/V digital media stream at said A/D digital output port;
said A/V digital media stream is electrically transmitted to said media input port of said storage controller;
said storage controller transmits said A/V digital media stream to a storage device connected to said storage I/O port, wherein said storage device creates an A/V stored media stream within said storage device;
said storage controller retrieves said A/V stored media stream from said storage device via said storage I/O port and transmits said A/V stored media stream to said media output port as an A/V retrieved media stream;
said A/V retrieved media stream is electrically transmitted to said D/A digital input port;
said D/A converter receives said A/V retrieved media stream as input to said D/A digital input port and converts said A/V retrieved media stream to an A/V reconstructed analog media stream at said D/A analog output port without processing by MPEG data decompression;
said A/V reconstructed analog media stream is electrically emitted at said
D/A analog output port for presentation using an A/V output device connected to said D/A analog output port;
said storage controller communicates with a CPU via said processor I/O port to determine the placement of said A/V digital media stream on said storage device;
said storage controller communicates with a CPU via said processor I/O port to control the retrieval of said A/V stored media stream from said storage device and the transfer of said A/V stored media stream to said D/A converter for presentation on said A/V output device;
said storage controller processor I/O port is configured to allow said CPU simultaneous access to said A/V stored media stream while said storage controller receives said A/V stored media stream;
said storage controller processor I/O port is configured to allow said CPU simultaneous access to said A/V stored media stream while said storage controller retrieves said A/V retrieved media stream;
said storage device comprises a serial daisy chain of Pass Thru Disk Drive Controller (PTDDC)-attached disk drives;
said PTDDC further comprises a Host Bus Adapter (HBA) interface port; and
said PTDDC interprets commands received from said HBA interface port that indicate the Logical Block Address (LBA) being addressed by said HBA interface port and mapping in real-time said LBA to a particular disk drive within a serially attached disk drive chain electrically coupled to said PTDDC and interpreting information from said HBA interface port to map said disk drive chain as one large disk drive as viewed from said HBA interface port.

2. The audio/video storage/retrieval system of claim 1 wherein said storage I/O port comprises a SATA disk drive interface.

3. The audio/video storage/retrieval system of claim 1 wherein said A/D converter further comprises a multiplexer to permit sequential simultaneous capture of multiple analog A/V media signaling inputs.

4. The audio/video storage/retrieval system of claim 1 wherein:
said A/D converter, said storage controller, and said D/A converter are integrated within a Pass Thru Disk Drive Controller (PTDDC) such that said processor I/O port functions as the Host Bus Adapter (HBA) interface port to said PTDDC; and
said PTDDC interprets commands received from said HBA interface port that indicate the Logical Block Address (LBA) being addressed by said HBA interface port and mapping in real-time said LBA to a particular disk drive within a serially attached disk drive chain electrically coupled to said PTDDC and interpreting information from said HBA interface port to map said disk drive chain as one large disk drive as viewed from said HBA interface port.

5. The audio/video storage/retrieval system of claim 1 wherein said A/D converter receives multiplexed analog A/V media signaling from a multi-channel broadband-to-baseband converter, said multi-channel broadband-to-baseband converter deriving its broadband input from a broadband A/V media source.

6. The audio/video storage/retrieval system of claim 5 wherein said broadband A/V media source is obtained from a cable network set-top box (STB).

7. The audio/video storage/retrieval system of claim 1 wherein said A/D converter receives analog A/V media signaling from a cable network set-top box (STB) converter, said cable network set-top box (STB) converter deriving its broadband input from a broadband A/V media source.

8. An audio/video storage/retrieval system comprising:
(a) A/D converter comprising an A/D analog input port and an A/D digital output port;
(b) storage controller comprising a media input port, media output port, processor I/O port, and storage I/O port;
(c) D/A converter comprising a D/A digital input port and a D/A analog output port; and
(d) broadband modulator comprising an A/V baseband input port and a A/V modulated output port;
wherein
said A/D converter receives analog A/V media signaling as input to said A/D analog input port and converts said analog A/V media signaling to a A/V digital media stream that has not been pre-processed by MPEG data compression;
said A/D converter emits said A/V digital media stream at said A/D digital output port;
said A/V digital media stream is electrically transmitted to said media input port of said storage controller;
said storage controller transmits said A/V digital media stream to a storage device connected to said storage I/O port, wherein said storage device creates an A/V stored media stream within said storage device;
said storage controller retrieves said A/V stored media stream from said storage device via said storage I/O port and transmits said A/V stored media stream to said media output port as an A/V retrieved media stream;
said A/V retrieved media stream is electrically transmitted to said D/A digital input port;
said D/A converter receives said A/V retrieved media stream as input to said D/A digital input port and converts said A/V retrieved media stream to an A/V reconstructed analog media stream at said D/A analog output port without processing by MPEG data decompression;
said A/V reconstructed analog media stream is received by said broadband modulator at said A/V baseband input port and converted via broadband modulation to produce an A/V broadband output signal electrically emitted at said A/V modulated output port for presentation using an A/V output device connected to said A/V modulated output port;
said storage controller communicates with a CPU via said processor I/O port to determine said placement of said A/V digital media stream on said storage device;
said storage controller communicates with a CPU via said processor I/O port to control the retrieval of said A/V stored media stream from said storage device and the transfer of said A/V stored media stream to said D/A converter for presentation on said A/V output device using said broadband modulator;
said storage controller processor I/O port is configured to allow said CPU simultaneous access to said A/V stored media stream while said storage controller receives said A/V stored media stream;
said storage controller processor I/O port is configured to allow said CPU simultaneous access to said A/V stored media stream while said storage controller retrieves said A/V retrieved media stream;
said storage device comprises a serial daisy chain of Pass Thru Disk Drive Controller (PTDDC)-attached disk drives;
said PTDDC further comprises a Host Bus Adapter (HBA) interface port; and
said PTDDC interprets commands received from said HBA interface port that indicate the Logical Block Address (LBA) being addressed by said HBA interface port and mapping in real-time said LBA to a particular disk drive within a serially attached disk drive chain electrically coupled to said PTDDC and interpreting information from said HBA interface port to map said disk drive chain as one large disk drive as viewed from said HBA interface port.

9. The audio/video storage/retrieval system of claim 8 wherein said storage I/O port comprises a SATA disk drive interface.

10. The audio/video storage/retrieval system of claim 8 wherein said A/D converter further comprises a multiplexer to permit sequential simultaneous capture of multiple analog A/V media signaling inputs.

11. The audio/video storage/retrieval system of claim 8 wherein:
said A/D converter, said storage controller, and said D/A converter are integrated within a Pass Thru Disk Drive Controller (PTDDC) such that said processor I/O port functions as the Host Bus Adapter (HBA) interface port to said PTDDC; and
said PTDDC interprets commands received from said HBA interface port that indicate the Logical Block Address (LBA) being addressed by said HBA interface port and mapping in real-time said LBA to a particular disk drive within a serially attached disk drive chain electrically coupled to said PTDDC and interpreting information from said HBA interface port to map said disk drive chain as one large disk drive as viewed from said HBA interface port.

12. The audio/video storage/retrieval system of claim 8 wherein said A/D converter receives multiplexed analog A/V media signaling from a multi-channel broadband-to-baseband converter, said multi-channel broadband-to-baseband converter deriving its broadband input from a broadband A/V media source.

13. The audio/video storage/retrieval system of claim 12 wherein said broadband A/V media source is obtained from a cable network set-top box (STB).

14. The audio/video storage/retrieval system of claim 8 wherein said A/D converter receives analog A/V media signaling from a cable network set-top box (STB) converter, said cable network set-top box (STB) converter deriving its broadband input from a broadband A/V media source.

15. An audio/video storage/retrieval method comprising:
(1) identifying an A/V source input;
(2) determining if said A/V source is baseband, and if so, proceeding to step (4);
(3) converting said A/V source input to a baseband A/V signal via a mixer;
(4) converting said baseband A/V signal to a digital representation using an A/D converter;
(5) storing said digitized representation without pre-processing by
MPEG data compression on a storage device using a dual port storage multiplexer;
(6) retrieving said digital representation from said storage device using said dual port storage multiplexer;
(7) converting said digital representation to a restored analog signal without processing by MPEG data decompression using a D/A converter;
(8) RF modulating said restored analog signal to generate a restored broadband signal;
(9) if a set-top-box (STB) is not present, proceeding to step (11);
(10) presenting said restored broadband signal to said STB;
(11) displaying said restored broadband signal or output from said STB on an A/V presentation device;
wherein
said storage device comprises a Pass Thru Disk Drive Controller (PTDDC) further comprising a Host Bus Adapter (HBA) interface port; and
said PTDDC interprets commands received from said HBA interface port that indicate the Logical Block Address (LBA) being addressed by said HBA interface port and mapping in real-time said LBA to a particular disk drive within a serially attached disk drive chain electrically coupled to said PTDDC and interpreting information from said HBA interface port to map said disk drive chain as one large disk drive as viewed from said HBA interface port.

16. The audio/video storage/retrieval method of claim 15 wherein said storage device further comprises a serial daisy chain of Pass Thru Disk Drive Controller (PTDDC)-attached disk drives.

17. The audio/video storage/retrieval method of claim 15 wherein said Host Bus Adapter (HBA) interface port further comprises a SATA disk drive interface.

18. The audio/video storage/retrieval method of claim 15 wherein said A/D converter further comprises a multiplexer to accept a plethora of said baseband A/V signals from a corresponding plethora of said A/V source inputs.

* * * * *